US012576364B2

(12) United States Patent
Jons et al.

(10) Patent No.: US 12,576,364 B2
(45) Date of Patent: Mar. 17, 2026

(54) SPIRAL WOUND MEMBRANE MODULES WITH SENSOR AND TRANSMITTER FIELD

(71) Applicant: DDP SPECIALTY ELECTRONIC MATERIALS US, LLC, Wilmington, DE (US)

(72) Inventors: Steven D. Jons, Minneapolis, MN (US); Luke Franklin, Minneapolis, MN (US); Sundeep Ramachandran, Edina, MN (US)

(73) Assignee: DDP SPECIALTY ELECTRONIC MATERIALS US, LLC, Wilmington, DE (US)

( * ) Notice: Subject to any disclaimer, the term of this patent is extended or adjusted under 35 U.S.C. 154(b) by 375 days.

(21) Appl. No.: 18/006,950

(22) PCT Filed: Jul. 9, 2021

(86) PCT No.: PCT/US2021/040997
§ 371 (c)(1),
(2) Date: Jan. 26, 2023

(87) PCT Pub. No.: WO2022/026156
PCT Pub. Date: Feb. 3, 2022

(65) Prior Publication Data
US 2023/0145145 A1 May 11, 2023

Related U.S. Application Data

(60) Provisional application No. 63/058,795, filed on Jul. 30, 2020.

(51) Int. Cl.
*B01D 63/10* (2006.01)
*B01D 61/12* (2006.01)
(Continued)

(52) U.S. Cl.
CPC ............. *B01D 63/10* (2013.01); *B01D 61/12* (2013.01); *B01D 61/22* (2013.01); *B01D 63/12* (2013.01);
(Continued)

(58) Field of Classification Search
None
See application file for complete search history.

(56) References Cited

U.S. PATENT DOCUMENTS 5,128,037 A 7/1992 Pearl et al.
5,538,642 A 7/1996 Solie
(Continued)

FOREIGN PATENT DOCUMENTS

CN 103282106 A 9/2013
CN 103459000 A 12/2013
(Continued)

OTHER PUBLICATIONS

International Search Report and Written Opinion in International Application No. PCT/US2021/040997, issued Jan. 5, 2022.
(Continued)

*Primary Examiner* — Eric S. McCall
*Assistant Examiner* — Nigel H Plumb

(57) ABSTRACT

A spiral wound membrane module includes a specialized endcap assembly including a connecting conduit defining a passageway extending radially inward from its outer periphery, and at least one sensor connected to the passageway of the connecting conduit. The specialized endcap assembly also includes a microprocessor, an antenna, and a LoRa transmitter. The at least one sensor, which is connected to the microprocessor, is suitable to provide a measured value corresponding to pressure, differential pressure, flow rate conductivity, pH, sound intensity, or light intensity. Spiral wound membrane module assemblies include a pressure
(Continued)

vessel and one or more of the spiral wound membrane modules.

24 Claims, 14 Drawing Sheets

(51) Int. Cl.

| | | |
|---|---|---|
| *B01D 61/22* | (2006.01) | |
| *B01D 63/12* | (2006.01) | |
| *G01L 13/02* | (2006.01) | |
| *G01L 19/00* | (2006.01) | |

(52) U.S. Cl.
CPC ........ *G01L 13/025* (2013.01); *G01L 19/0007* (2013.01); *B01D 2313/903* (2022.08); *B01D 2319/02* (2013.01)

(56) References Cited

U.S. PATENT DOCUMENTS

| | | | |
|---|---|---|---|
| 5,851,267 | A | 12/1998 | Schwartz |
| 6,074,595 | A | 6/2000 | Eisberg et al. |
| 6,165,303 | A | 12/2000 | Darby et al. |
| 6,190,557 | B1 | 2/2001 | Hisada et al. |
| 6,224,767 | B1 | 5/2001 | Fujiwara et al. |
| 6,299,772 | B1 | 10/2001 | Huschke et al. |
| 6,632,356 | B2 | 10/2003 | Hallan et al. |
| 6,936,160 | B2 | 8/2005 | Moscaritolo et al. |
| 7,048,775 | B2 | 5/2006 | Jornitz et al. |
| 7,198,719 | B2 | 4/2007 | Chikura et al. |
| 7,208,088 | B2 | 4/2007 | Almasian et al. |
| 7,875,177 | B2 | 1/2011 | Haynes et al. |
| 7,886,582 | B2 | 2/2011 | Donaque |
| 7,951,295 | B2 | 5/2011 | Larson et al. |
| 8,110,016 | B2 | 2/2012 | McCollam |
| 8,142,588 | B2 | 3/2012 | McCollam |
| 8,210,042 | B2 | 7/2012 | Mickols et al. |
| 8,221,522 | B2 | 7/2012 | DiLeo et al. |
| 8,272,251 | B2 | 9/2012 | Jons et al. |
| 8,337,698 | B2 | 12/2012 | Hou |
| 8,377,300 | B2 | 2/2013 | Katayama et al. |
| 8,388,842 | B2 | 3/2013 | Shelby et al. |
| 8,425,773 | B2 | 4/2013 | Bonta et al. |
| 8,519,559 | B2 | 8/2013 | Konishi et al. |
| 8,568,596 | B2 | 10/2013 | Konishi et al. |
| 8,608,964 | B2 | 12/2013 | Hiro et al. |
| 8,617,397 | B2 | 12/2013 | Ikeyama et al. |
| 8,668,828 | B2 | 3/2014 | Knappe et al. |
| 8,778,182 | B2 | 7/2014 | Johnson et al. |
| 8,808,539 | B2 | 8/2014 | Karabelas et al. |
| 9,381,469 | B2 | 7/2016 | Elwell et al. |
| 9,623,379 | B2 | 4/2017 | Lanz et al. |
| 10,137,416 | B2 | 11/2018 | Jons et al. |
| 2008/0308504 | A1 | 12/2008 | Hallan et al. |
| 2011/0114561 | A1 | 5/2011 | Konishi et al. |
| 2013/0161258 | A1 | 6/2013 | Marschke et al. |
| 2014/0151695 | A1 | 6/2014 | Yamazaki |
| 2014/0180610 | A1* | 6/2014 | Chatterjee ............. G01F 1/8436 |
| | | | 702/45 |
| 2015/0029140 | A1 | 1/2015 | Hwang et al. |
| 2020/0197869 | A1* | 6/2020 | Coster .................... B01D 63/10 |

FOREIGN PATENT DOCUMENTS

| | | |
|---|---|---|
| CN | 109641177 A | 4/2019 |
| CN | 110621393 A | 12/2019 |
| JP | 59150505 A | 8/1984 |
| JP | 62049902 | 3/1987 |
| JP | 2013071098 A | 4/2013 |
| JP | 5287789 B2 | 9/2013 |
| JP | 2016019932 A | 2/2016 |
| WO | 2012117669 A1 | 9/2012 |
| WO | 2014099324 A1 | 6/2014 |
| WO | 2017019282 A1 | 2/2017 |
| WO | 2019022864 A1 | 1/2019 |

OTHER PUBLICATIONS

Drazan, et al., "Archimedean spiral pairs with no electrical connections as passive wireless implantable sensors", J. Biomedical Technology and Research, 2014, 1(1), p. 8.

* cited by examiner

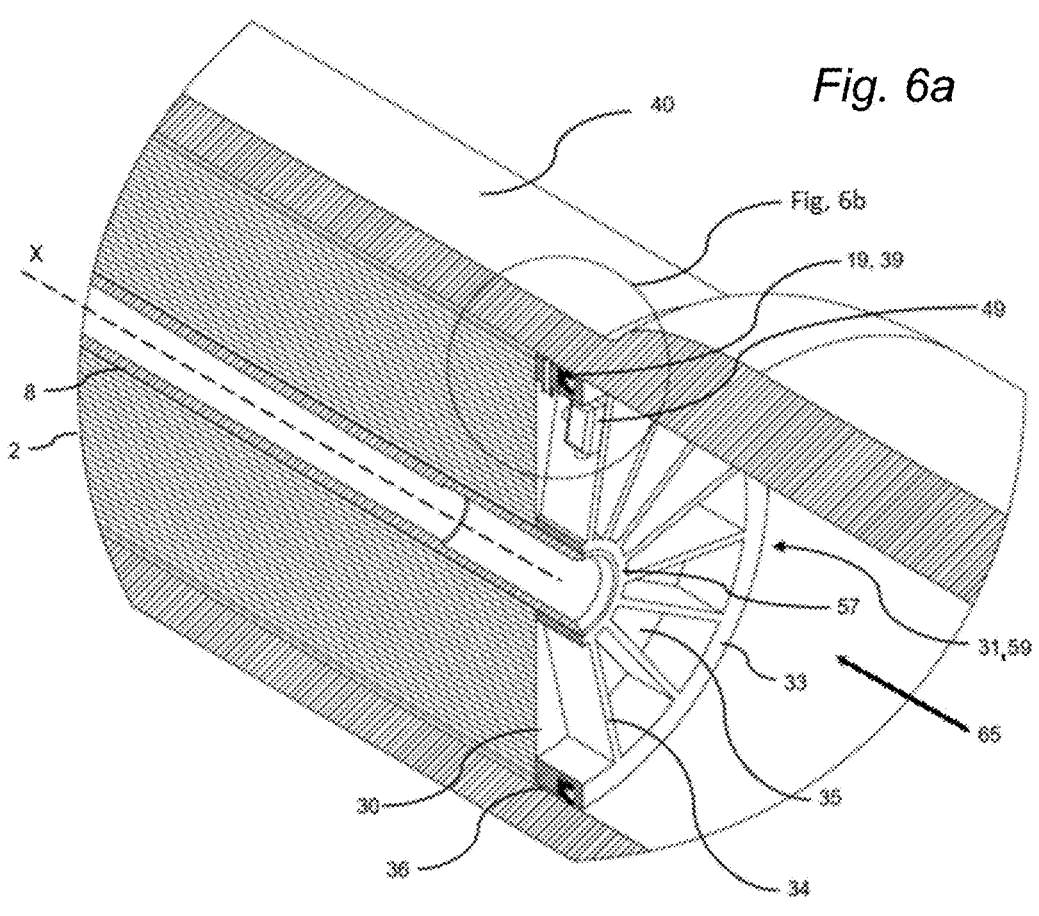
*Fig. 6a*
*Fig. 6b*
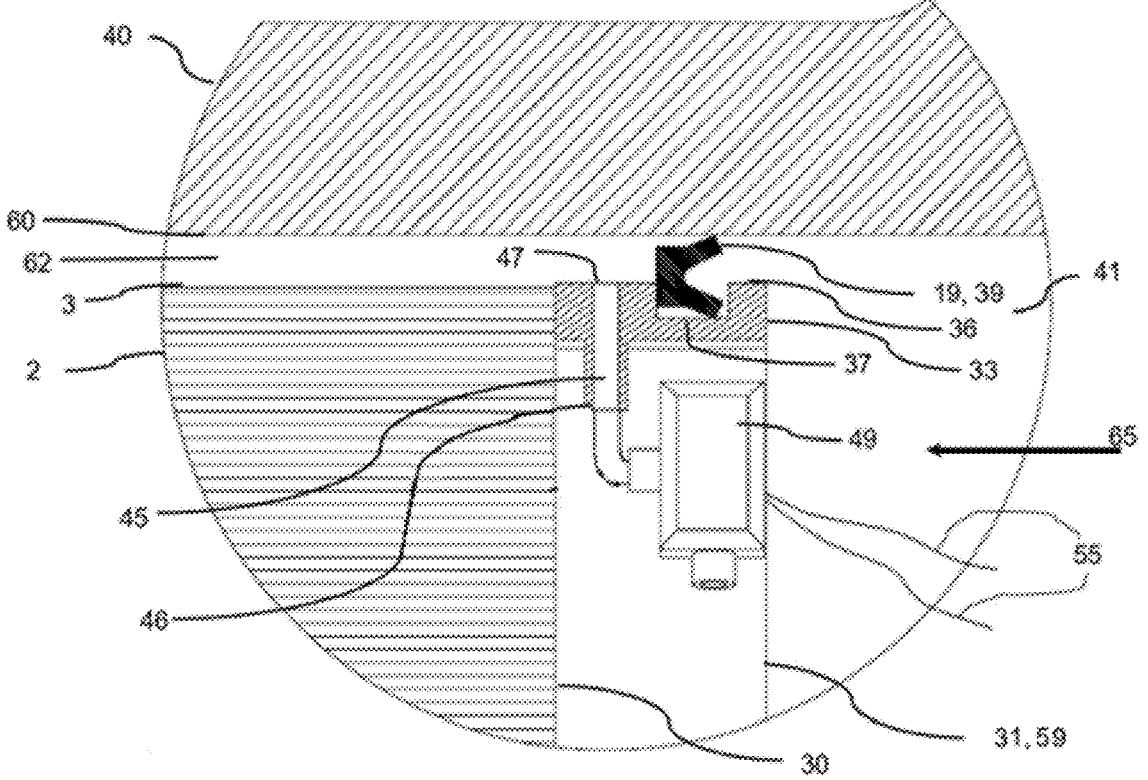

SPIRAL WOUND MEMBRANE MODULES WITH SENSOR AND TRANSMITTER FIELD

FIELD

The invention generally relates to spiral wound membrane modules having a sensor and transmitter, and related assemblies useful for separation or concentration of constituents in fluids.

INTRODUCTION

Spiral wound membrane modules are used in several fluid separation applications, including reverse osmosis, nanofiltration, ultrafiltration, and microfiltration. In typical industrial practice, spiral wound membrane modules ("elements") are serially connected within a common pressure vessel. Facilities often include multiple trains and/or stages of vessels, each including from 4-8 spiral wound membrane modules. Particularly for high permeability membranes, such as microfiltration and ultrafiltration, maintaining even flux distribution across the vessel can be a problem. Pressures on the both the feed and permeate side will vary in both axial and radial directions, both within a module and between modules down the vessel. Differences in net-driving-pressure will modify flux and, in turn, impact separation performance, fouling, and the ability to subsequently clean the modules. In some cases, water quality measurements (eg. conductivity, turbidity, fluorescence) for feed or permeate fluids can be indicative of leaks, fouling, scaling, or changes to the membrane. In other situations, changing flow rates for feed-side or permeate-side fluids can indicate anomalous behavior and/or measured values may be used to normalize permeate quality to these operating conditions.

Monitoring of pressure, flow, conductivity, turbidity, and/or fluorescence at various points in the assembly can provide information that allows an operator to take appropriate measures (e.g. selective replacement of modules, increase pretreatment of feed fluid, more aggressive cleaning of modules). However, because modules are sealed within pressure vessels, the monitoring of feed and permeate fluids, flow rates, absolute pressures, and pressure losses at different points is difficult. Nevertheless, a variety of techniques have been developed, see for example: US2014/0180610, U.S. Pat. Nos. 8,808,539, 8,617,397, 8,568,596, 8,519,559, 8,272,251, 8,210,042, 7,886,582, US2011/10114561, WO2012/117669 and JP2016/019932. Similar techniques have also been used on other types of filtration devices, e.g. U.S. Pat. Nos. 6,936,160, 7,048,775 and 8,221,522. Less complicated monitoring systems are desired, including those that offer one or more of the following: i) increased accuracy, ii) little modification of existing modules and pressure vessels, iii) use of fewer or simpler sensors and iv) the avoidance of retractable probes.

SUMMARY

The invention includes a spiral wound membrane module and related assemblies including a pressure vessel, their method of manufacture and use, and combinations of such assemblies. Spiral wound membrane modules preferably include at least one membrane envelope wound about a permeate collection tube.

The present invention is directed to a spiral wound module (2) comprising:
   a) at least one membrane envelope (4) wound about a hollow permeate collection tube (8) to form a cylinder with first scroll face (30), an opposing scroll face (32), and an outer peripheral surface (3),
   b) a porous center section (15) of the permeate collection tube (8) located axially between a first distal section (23) of the permeate collection tube (8) near the first scroll face (30) and an opposing distal section (25) of the permeate collection tube (8) near the opposing scroll face (32), wherein the porous center section (15) contains holes (24) that pass from the inside surface (5) to the outside surface (7) of the permeate collection tube (8) and that connect a permeate channel (12) within the membrane envelope (4) to the interior cavity (9) of the hollow permeate collection tube (8),
   c) a feed channel (6) adjacent to the membrane envelope (4), wherein the feed channel is suitable to enable feed flow through the spiral wound membrane module (2) between the first scroll face (30) and the opposing scroll face (32), and
   d) at least one endcap assembly (31) affixed to the spiral wound module (2) and adjacent said first scroll face (30);
wherein the spiral wound module assembly is characterized by:
   the endcap assembly (31) comprising a microprocessor, an antenna, a LoRa transmitter, and at least one sensor connected to the microprocessor, wherein said sensor is suitable to measure a value corresponding to pressure, differential pressure, flow rate, conductivity, sound intensity, or light intensity, and wherein said LoRa transmitter is suitable to transmit said measured value by providing sequential chirps at a radio frequency between 400 MHz and 1000 MHz.

The present invention is further directed to a spiral wound module assembly (21) comprising:
   a) a pressure vessel (40) comprising: a chamber (41) including an inner peripheral surface (60) extending along an axis (X) between a first vessel end (38) and a second vessel end (38'), and at least one feed inlet port (42), concentrate outlet port (42'), and permeate outlet port (44);
   b) a first spiral wound module (2') located within the chamber (41), said first spiral wound module (2') comprising:
      i) at least one first membrane envelope (4') wound about a hollow first permeate collection tube (8') to form a cylinder with first scroll face (30'), a first opposing scroll face (32'), and a first outer peripheral surface (3'),
      ii) a first porous center section (15') of the first permeate collection tube (8') is located axially between two first distal sections (23', 25'), wherein the first porous center section (15') contains a first set of holes (24') that pass from a first inside surface (5') to a first outside surface (7') of the first permeate collection tube (8') and that connect a first permeate channel (12') within the first membrane envelope (4') to the first interior cavity (9') of the first permeate collection tube (8'),
      iii) a first feed channel (6') adjacent to the first membrane envelope (4'), wherein the first feed channel (6') is suitable to enable feed flow through the first spiral wound module (2') between the first scroll face (30') and the first opposing scroll face (32'), and
      iv) a first endcap assembly (31') affixed to the first spiral wound module (2') and abutting the first scroll face (30'), said first endcap assembly (31') including a first outer ring (33') that defines a first outer periphery (36') of the first endcap assembly (31');

c) a second spiral wound module (2") adjacent the first spiral wound module (2'), said second spiral wound module (2") comprising:

i) at least one second membrane envelope (4") wound about a hollow second permeate collection tube (8") to form a cylinder with second scroll face (30"), a second opposing scroll face (32"), and a second outer peripheral surface (3"), ii) a second porous center section (15") of the second permeate collection tube (8') is located axially between second distal sections (23", 25") of the second permeate collection tube (8'), wherein the second porous center section (15") contains a second set of second holes (24") that pass from the second inside surface (5") to the second outside surface (7") of the second permeate collection tube (8") and that connect a second permeate channel (12") within the second membrane envelope (4") to the second interior cavity (9") of the second permeate collection tube (8'), iii) a second feed channel (6") adjacent to the second membrane envelope (4"), wherein the second feed channel (6") is suitable to enable feed flow through the second spiral wound module (2") between the second scroll face (30") and the second opposing scroll face (32"), and iv) a second endcap assembly (31") affixed to the second spiral wound module (2") and abutting the second scroll face (30");

wherein the first endcap assembly (31') is adjacent the second endcap assembly (32"); a feed fluid pathway (61) passes through a central region (63) located between the first scroll face (30') and the second scroll face (30") and connects the first feed channel (6') with the second feed channel (6"); the feed fluid pathway (61) comprising a feed fluid access pathway (65) connected to the first feed channel (6') at the first scroll face (30'); and the first outer ring (33') surrounds the feed fluid access pathway (65) and includes a radially extending annular feed flow resistor (19) contacting the inner peripheral surface (60) of the chamber (41); and wherein the spiral wound module assembly (21) is characterized by:

an instrumented endcap assembly (59) selected from the first endcap assembly (31') and the second endcap assembly (31"), wherein the instrumented endcap assembly (59) comprises a microprocessor, an antenna, a LoRa transmitter, and at least one sensor connected to the microprocessor, wherein said sensor is suitable to measure a value corresponding to pressure, differential pressure, flow rate, conductivity, sound intensity, or light intensity, and wherein said LoRa transmitter is suitable to transmit said measured value by providing sequential chirps at a radio frequency between 400 MHz and 1000 MHz.

BRIEF DESCRIPTION OF THE DRAWINGS

The figures are not to scale and include idealized views to facilitate description. Where possible, like numerals have been used throughout the figures and written description to designate the same or similar features. Some figures and descriptions include either single or double quotation marks after numerals to indicate features corresponding to either the first or second module of two adjacent modules. In other cases, a single quote has been used to designate a similar item in a different location, such as at the other end of a permeate tube or vessel.

FIG. 6*a* is a cutaway view of a spiral wound membrane module within a pressure vessel. The module contains a connecting conduit through the outer ring of an endcap assembly and a differential pressure sensor within the outer ring.

FIG. 6*b* is a cross section of the vessel, module, and endcap assembly in the location of the connecting conduit and differential pressure sensor. The connecting conduit fluidly connects the differential pressure sensor to the peripheral space between the module and vessel.

DETAILED DESCRIPTION

Spiral wound membrane modules include one or more membrane envelopes and feed spacer sheets wound about a permeate collection tube. While spiral wound configurations are most commonly used for reverse osmosis (RO) and nanofiltration (NF), the present invention is also particularly suitable for use in low pressure applications such as ultrafiltration (UF) and microfiltration (MF).

Figure 1:
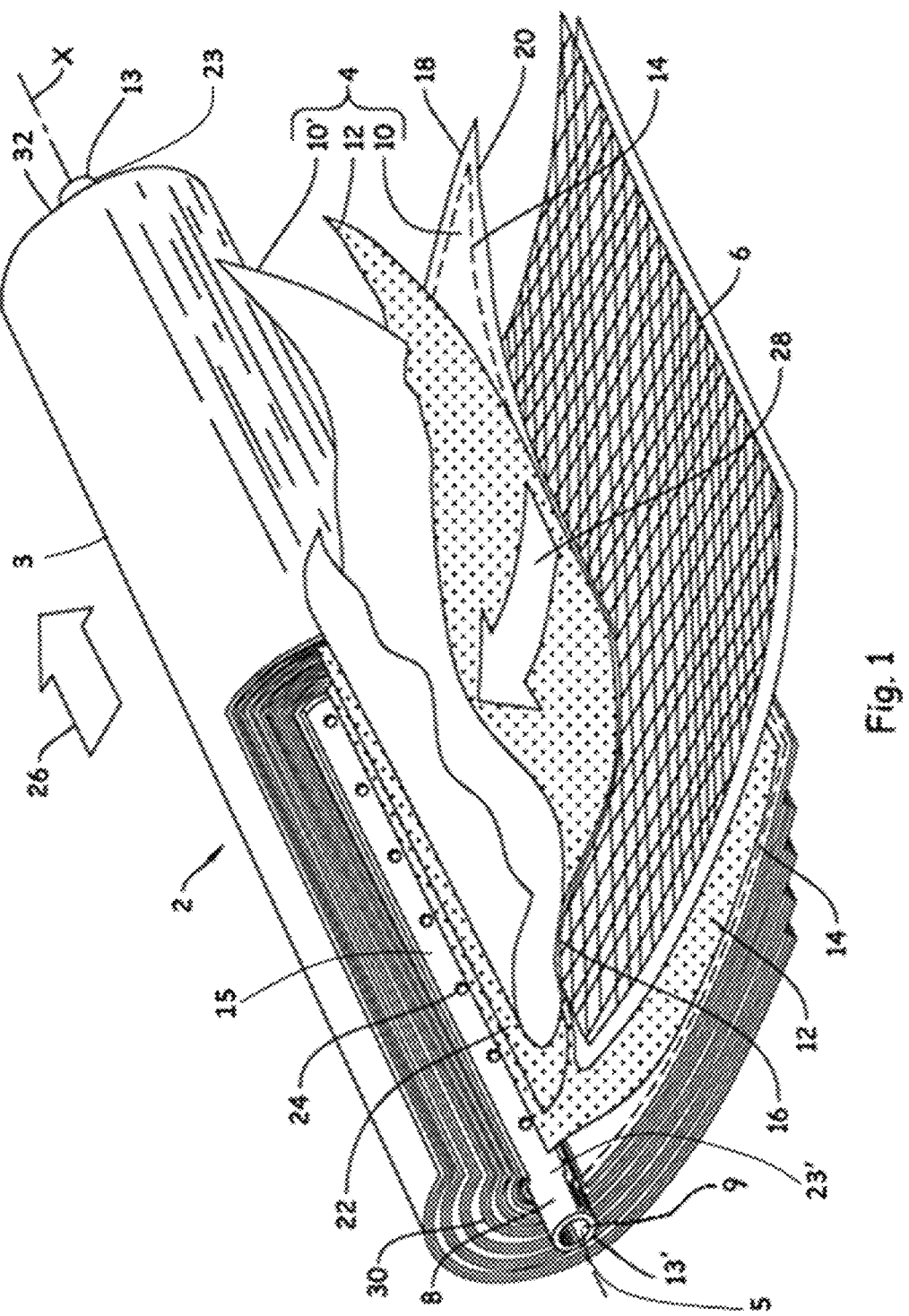
FIG. 1 is a perspective, partially cut-away view of a partially assembled spiral wound membrane module, including arrows to indicate axial feed flow and inwardly radial permeate flow.

A representative spiral wound membrane module is generally shown at 2 in FIG. 1. The module (2) is formed by concentrically winding one or more membrane envelopes (4) and optional feed spacer sheet(s) ("feed spacers") about a hollow permeate collection tube (8), forming alternating membrane envelopes (4) and feed channels (6). Each membrane envelope (4) preferably comprises two substantially rectangular sections of membrane sheet (10, 10'). Each section of membrane sheet (10, 10') often comprises a membrane or front side and support or back side. The membrane envelope (4) is formed by overlaying membrane sheets (10, 10') and aligning their edges. In a preferred embodiment, the sections (10, 10') of membrane sheet surround a permeate spacer sheet that forms a permeate channel (12). This sandwich-type structure is secured together, e.g. by sealant (15), along three edges (16, 18, 20) to form an envelope (4) while a fourth edge, i.e. "proximal edge" (22) abuts the permeate collection tube (8) so that the inside portion of the envelope (4) (and permeate channel (12), which may optionally be formed of a permeate spacer sheet) is in fluid communication with the holes (24) extending along a portion of the length of the permeate collection tube (8). The module (2) may include a single envelope or a plurality of membrane envelopes (4) each separated by an adjacent feed channel (6). In the illustrated embodiment, membrane envelopes (4) are formed by joining the backside surfaces of adjacently positioned membrane leaf packets. A membrane leaf packet comprises a substantially rectangular membrane sheet (10) folded upon itself to define two membrane "leaves" wherein the front sides of each leaf are facing each other and the fold is axially aligned with the proximal edge (22) of the membrane envelope (4), i.e. parallel with the permeate collection tube (8). A feed spacer sheet forming a feed channel (6) is shown located between facing front sides of the folded membrane sheet (10). While not shown, additional intermediate layers may also be included in the assembly. Representative examples of membrane leaf packets and their fabrication are further described in U.S. Pat. Nos. 7,875,177 and 8,608,964. Prototypical membranes for reverse osmosis are FilmTec Corporation's FT-30™ type membranes, made by an interfacial polymerization of polyfunctional amine and acyl halide monomers upon a porous support.

During module fabrication, permeate spacer sheets may be attached about the circumference of the permeate collection tube (8), with membrane leaf packets interleaved therebetween. The permeate collection tube (8) has an outside surface (7), an inside surface (5), and an interior cavity (9) bounded by the inside surface (5). The permeate collection tube (8) extends along an axis (X) between opposing first and second ends (13', 13) of the tube, and a porous section (15) includes a plurality of holes (24) along its length. The porous section (15) of the permeate collection tube (8) is located axially between two distal sections (23, 23') at opposing ends of the permeate collection tube. The porous section (15) is distinct from distal sections (23, 23') in that holes (24) in the porous section (15) enable liquid to pass from the tube's inside surface (5) to its outside surface (7), and because these holes connect the interior cavity (9) of the permeate collection tube (8) to a permeate channel (12) within a membrane envelope (4).

The back sides of adjacently positioned membrane leaves (10, 10') are sealed about portions of their periphery (16, 18, 20) to enclose a permeate channel (12) and to form a membrane envelope (4). Suitable techniques for attaching the permeate spacer sheet to the permeate collection tube are described in U.S. Pat. No. 5,538,642. The membrane envelope(s) (4) and feed spacer(s) (6) are wound or "rolled" concentrically about the permeate collection tube (8) extending along an axis (X) to form two scroll faces (30, 32). The scroll faces of the module may then be trimmed, and a sealant may optionally be applied at the junction between the scroll face and permeate collection tube (8) as described in U.S. Pat. No. 7,951,295. An impermeable layer such as tape may be wound about the circumference of the wound module as described in U.S. Pat. Nos. 8,142,588 and 8,668, 828. In alternative embodiments, a porous tape or fiberglass coating may be applied to the module's periphery. See for example U.S. Pat. No. 9,623,379.

With further reference to FIG. 1, in operation pressurized feed fluid (e.g. water) is shown entering the module (2) through a scroll face (30), i.e. "upstream," and flows in a generally axial direction through the module and exits as concentrate at the opposing scroll face (32) in the direction shown by arrow (26), i.e. "downstream." Permeate flows along an inwardly radial permeate flow path generally shown by arrow (28) which extends through the membrane (10, 10') and into the membrane envelope (4) where it flows into the holes (24), through the permeate collection tube (8) and exits at an end (13, 13') of the permeate collection tube (8).

Figure 2A:
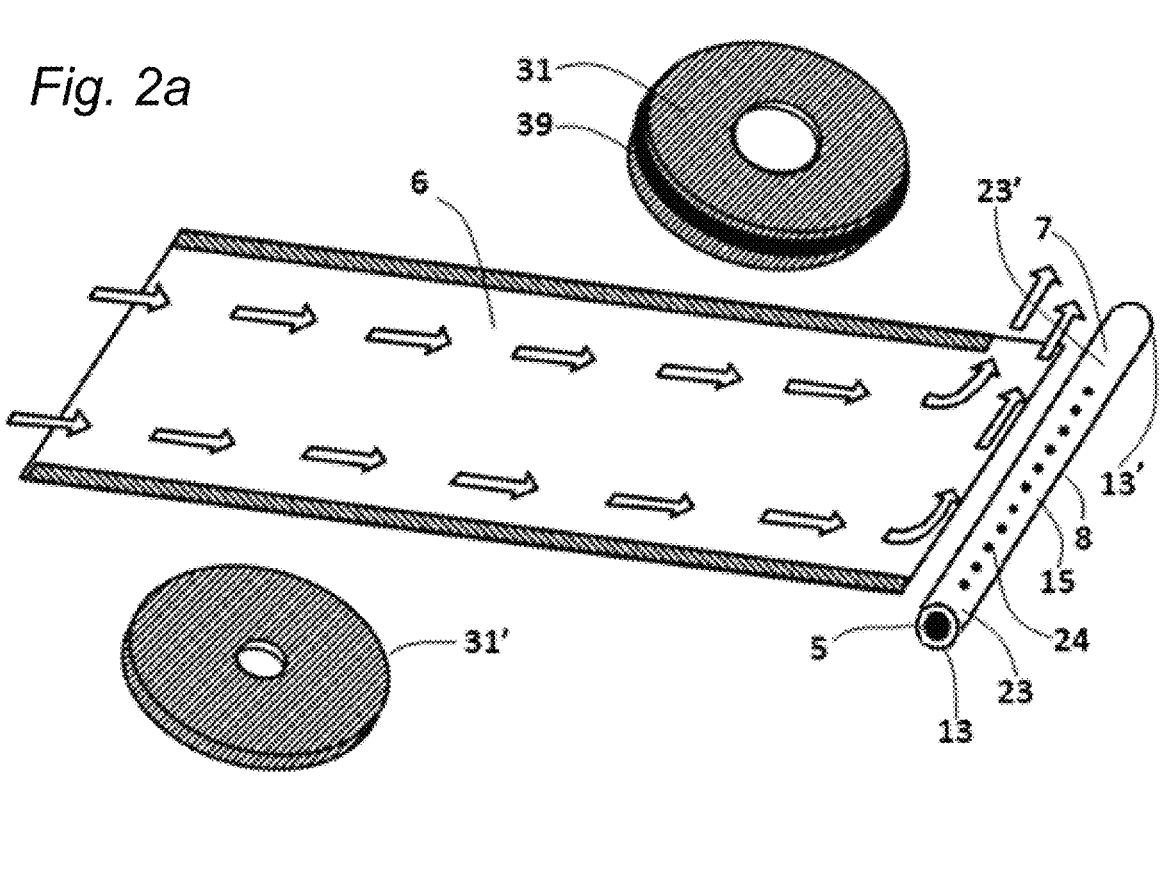
FIG. 2*a* is a perspective view illustrating a membrane sheet unrolled from the permeate tube, and endcaps that may be used to cover parts of the opposing scroll faces to induce radial flow, from an outer peripheral surface to a region on the downstream end and near the permeate tube.
Figure 2B:
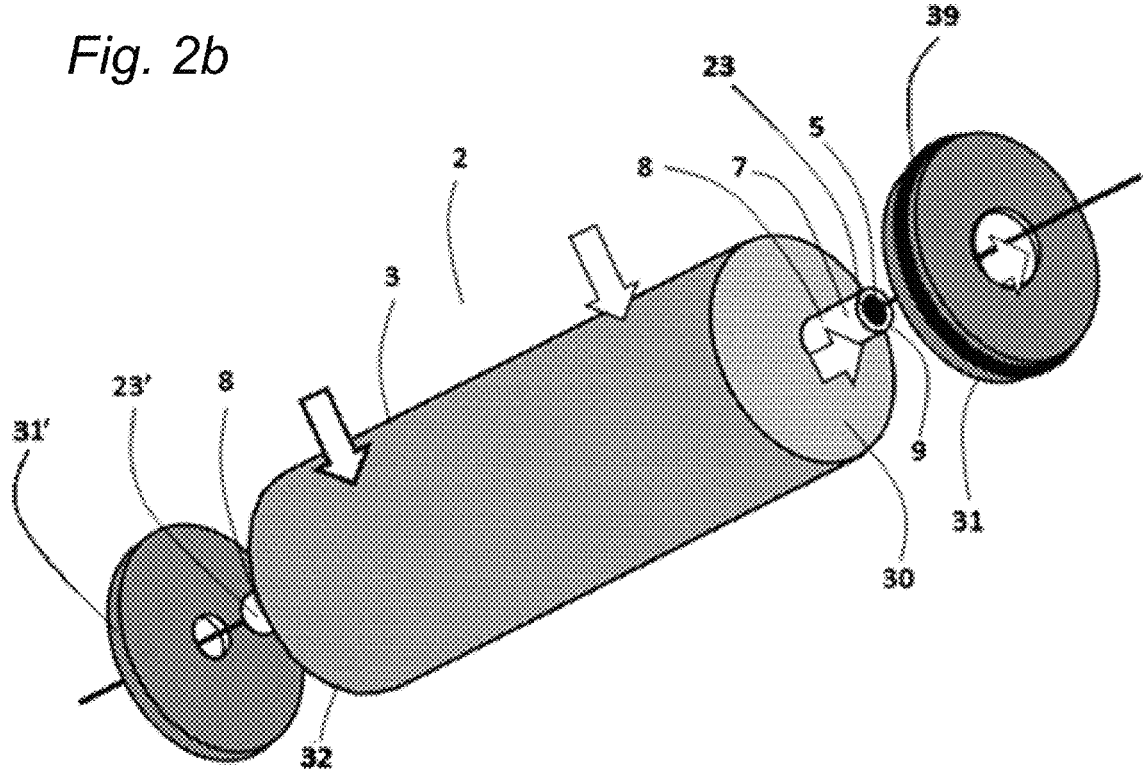
FIG. 2*b* is a perspective view illustrating a rolled spiral wound module (corresponding to FIG. 2*a*) and endcaps to partially block the scroll face and induce radial flow. Arrows illustrate a radial feed flow, with concentrate removed from a region of feed channel near the permeate tube.

FIGS. 2a and 2b show one approach to create an alternative spiral wound module with radial feed flow. Similar to the process illustrated in FIG. 1, at least one membrane envelope (4) is wound about a hollow permeate collection tube (8) to form a cylinder with a first scroll face (30), an opposing scroll face (32), and an outer peripheral surface (3). However, by providing a module (2) with a porous outer surface (3) and by abutting endcap assemblies (31, 31') to the two opposing scroll faces (30, 32), the location of feed flow into and out of the scroll faces (30, 32) can be modified. In FIG. 2b, the first endcap assembly (31) is illustrated to block the first scroll face (30) and force feed fluid to enter a feed channel (6) through a porous outer peripheral surface (3). At the same time, the endcap assembly (31) abutting the opposing scroll face (32) enables feed to leave the feed channel (6) through a region of the opposing scroll face (32) near the permeate tube (8). The figure illustrates a brine seal (39) on the endcap assembly (31) to prevent bypass. As in FIG. 1, feed channels (6) are located between the module's two scroll faces (30, 32), but the dominant direction for feed flow through the module is generally perpendicular (not parallel) to the permeate collection tube. Other approaches to obtain a generally radially directed feed flow, whether inward or outward, are described in U.S. Pat. No. 8,337,698, U.S. Ser. No. 10/137,416B2, JP2013071098A, and JP59150505A.

Figure 3:
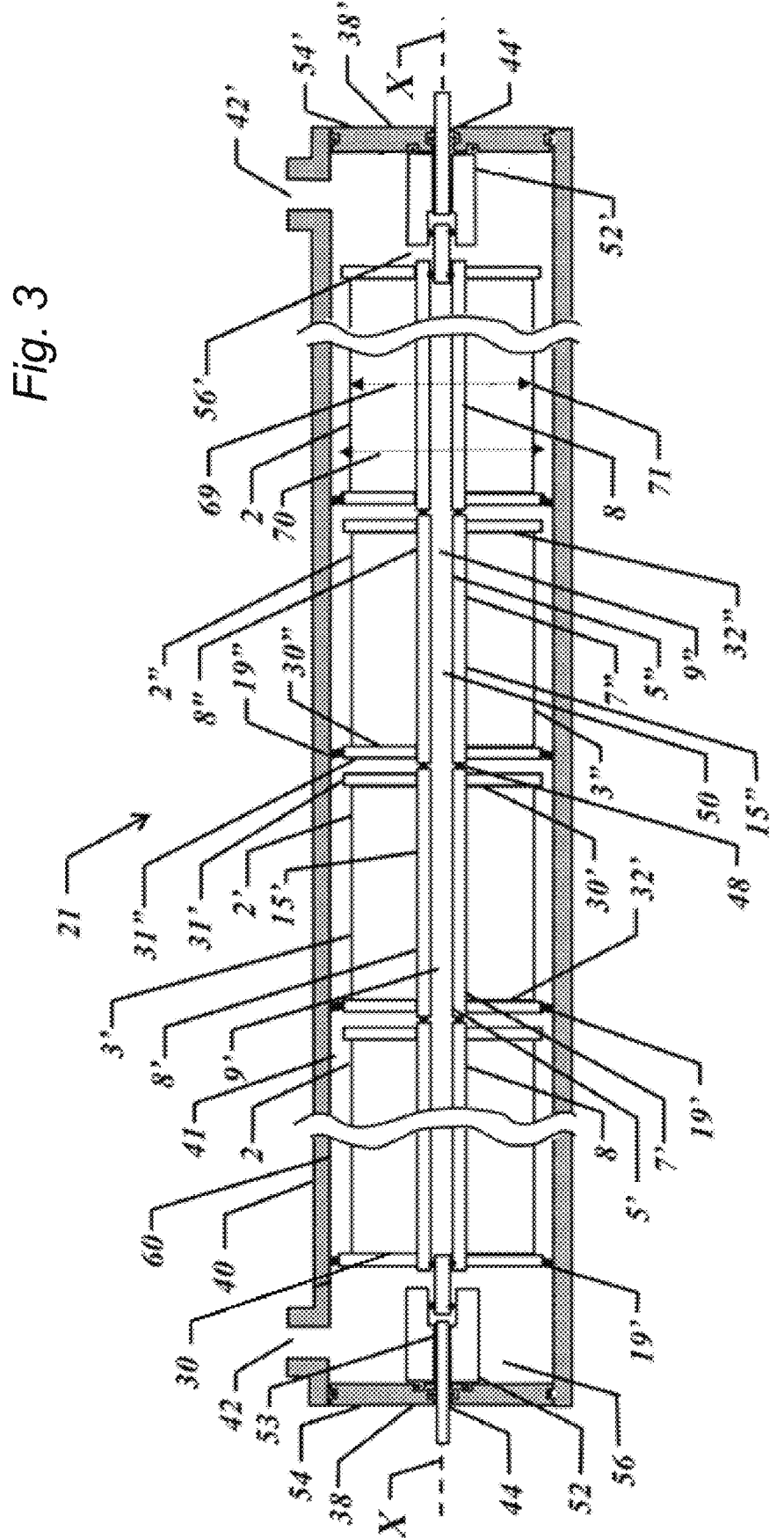
FIG. 3 is a perspective, partially cut-away view of a spiral wound membrane module assembly showing a spiral wound membrane module located within a pressure vessel, including adjacent first and second spiral wound modules.

FIG. 3 illustrates multiple spiral wound modules (3) within a vessel (40) to form a spiral wound module assembly (21). Endcap assemblies (31) can affect the flow of fluid streams between modules in a system. An endcap assembly (31) (also referred to and used as an "anti-telescoping device") can be located upon one or both scroll faces (30 or 32) of the module (2). Different embodiments of endcap assemblies are shown in FIGS. 4*a*, 4*b*, 4*c*, 5*a*, 5*b*, 5*c*, and 5*d*. To facilitate description for two adjacent endcap assemblies, FIGS. 3, 5*a*, 5*b*, 5*c*, and 5*d* number adjacent scroll faces of adjacent first module (2') and second module (2") as a first scroll face (30') and a second scroll face (30"), respectively. In FIG. 3, scroll faces on the opposite end of the module are then numbered as first opposing scroll face (32') and second opposing scroll face (32"). In a similar manner, descriptions of other features (e.g. permeate collection tube (8',8")) on the first and second adjacent modules are shown with single and double primes, respectively. The designation and wording is not intended to identify a feed flow direction, and a feed solution may move in a direction from the first scroll face toward the second scroll face, but feed solution may also flow in the opposite direction. When a single endcap assembly (31) is present on a module (2), it preferably is located for this invention on the feed inlet end of the module with axial flow designs and on the feed outlet end of the module with radial flow designs. However, it will be appreciated by those skilled in the art that a module (2) having only a single endcap assembly (31) may also be oriented oppositely within the pressure vessel (40). In more preferred embodiments, endcap assemblies (31) abut both scroll faces (30, 32) of each spiral wound membrane module (2), although features on each endcap assembly (31) may be different.

Figures 4A, 4B, 4C:
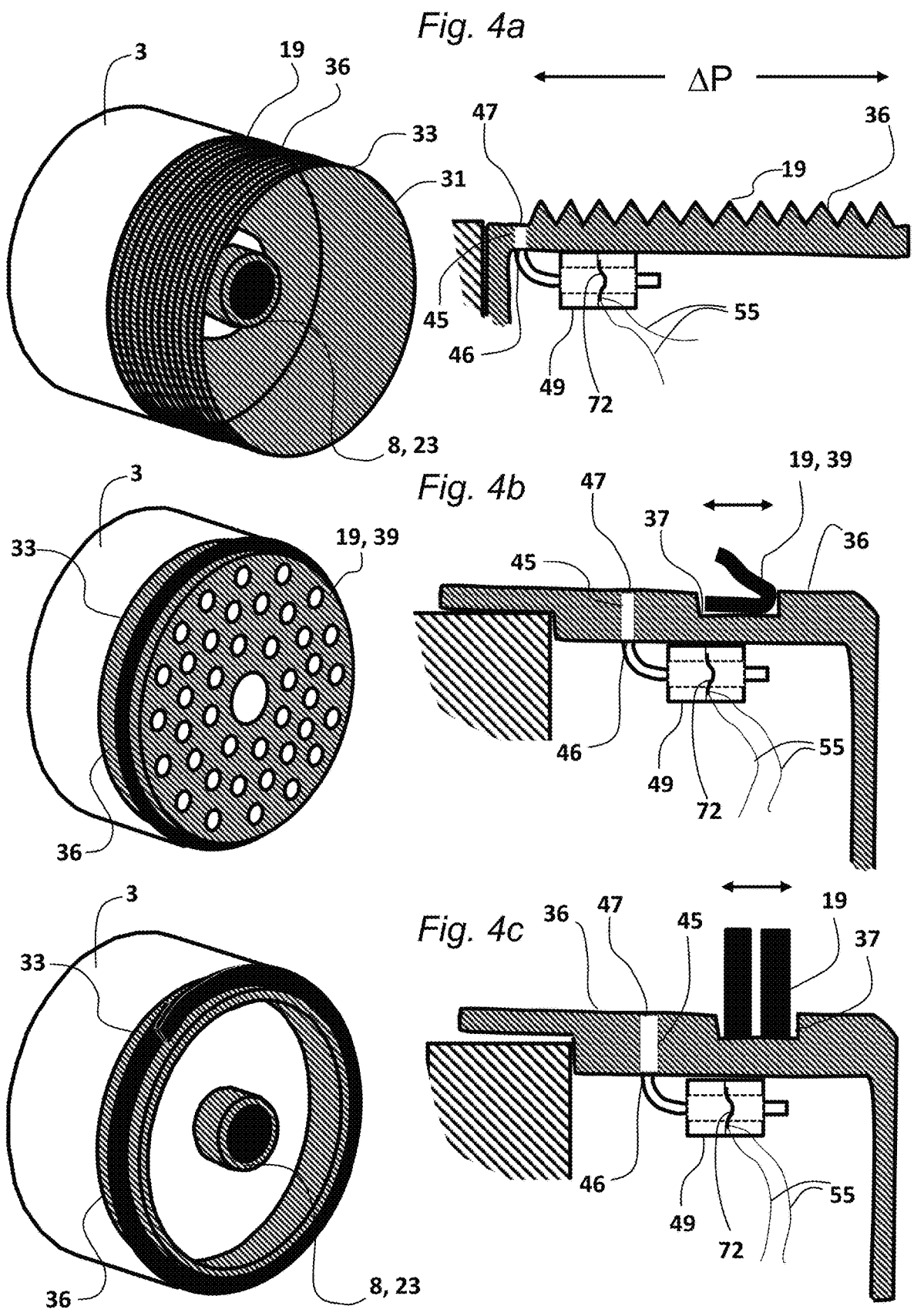
FIGS. 4*a*, 4*b*, and 4*c* show perspective views (on the left) of spiral wound module ends with three different endcap assemblies and corresponding cross sections (on the right), at the location of a conduit passing through the outer ring. For the three figures, the feed flow resistor on the ring comprises, respectively, a) continuous threads about its outer diameter, b) a flexible brine seal, and c) an expanding overlapping split ring.

The configuration of an endcap assembly (31) is not particularly limited but it may include an inner ring (57), an outer ring (33), or both. The endcap assembly (31) abuts a scroll face (30, 32) and is preferably affixed (e.g. by adhesive, spin welding, tape) to at least one location on the spiral wound module. A location for attachment may be selected from the permeate collection tube (8), the module's outer peripheral surface (3), and the abutting scroll face (30, 32). In FIG. 3, the endcap assemblies are shown without details so as facilitate description. In FIGS. 4*a*, 4*b*, and 4*c*, the perspective view of each endcap assemblies omits features more easily identified in the associated cross sections. However, these embodiments (and those other figures) are in no way limiting, and additional features may be present that are not shown. For instance, as indicated in FIGS. 5*a*-5*d*, and 7*a*, the endcap assembly also may include interlocking features (58) adapted to releasably engage with the corresponding endcap of an adjacently positioned separation module, said interlocking features (58) may create or maintain compression of a sealing member (48) between seal surfaces (51) on adjacent modules (2). In preferred embodiments, the endcap assembly (31) comprising a connecting conduit (45) that passes radially through a portion of the endcap assembly (31), defining a fluid passageway between an inner conduit end (46) and an outer conduit end (47). A differential pressure sensor (49) is attached to the endcap assembly (31) and fluidly connected to the fluid passageway of the connecting conduit (45).

In several embodiments, at least one end of the module (2) preferably includes an endcap assembly (31) with an outer ring (33) that defines a first outer periphery (36) of the endcap and includes a radially extending annular feed flow resistor (19) between the endcap assembly (31) and the inner peripheral surface (60) of the chamber (41). The radially extending annular feed flow resistor is suitable in operation to provide a constricted path for feed flow between the associated endcap assembly (31) and the inner peripheral surface (60) of the vessel chamber (41), such that at least 75% of feed flow passes through the module within a feed channel (6) instead of passing between the endcap assembly (31) and inner peripheral surface (60). Three embodiments of endcap assemblies (31) with a different feed flow resistor (19) are illustrated in FIGS. 4*a*, 4*b*, and 4*c*. These include a tightly-fitted, threaded outer surface which is intended to allow some bypass, a conventional brine seal (39) within an annular groove (37) on the endcap assembly (31), and an overlapping split ring also within an annular groove (37). In preferred embodiments, a spiral wound module contains an annular groove (37) is located on the first outer periphery (36) of the first outer ring (33), and the annular groove (37) contains a radially extending annular feed flow resistor (19) that is a brine seal (39) suitable to engage with the inner peripheral surface (60) of the chamber (41). For each of the three cases, a double-sided horizontal arrow indicates the primary region over which the annular feed flow resistor (19) would induced pressure drop during flow.

In preferred embodiments, an outer ring (33') comprises a feed flow resistor (19) and surrounds a feed fluid access pathway (65) connected to the first feed channel (6) at the first scroll face (30). The feed fluid access pathway (65) may include at least one endcap aperture (35) in the endcap assembly (31). Drawings in FIGS. 5*a*, 5*b*, 5*c*, and 5*d* of adjacent modules (3', 3") show a feed fluid pathway (61) that comprises the feed fluid access pathway (65) and that connects the first feed channel (6') with the second feed channel (6"). The feed fluid pathway (61) passes through a central region (63) located between the adjacent scroll faces (a first scroll face (30') and a second scroll face (30")) of adjacent modules (2', 2").

Figures 5A, 5B:
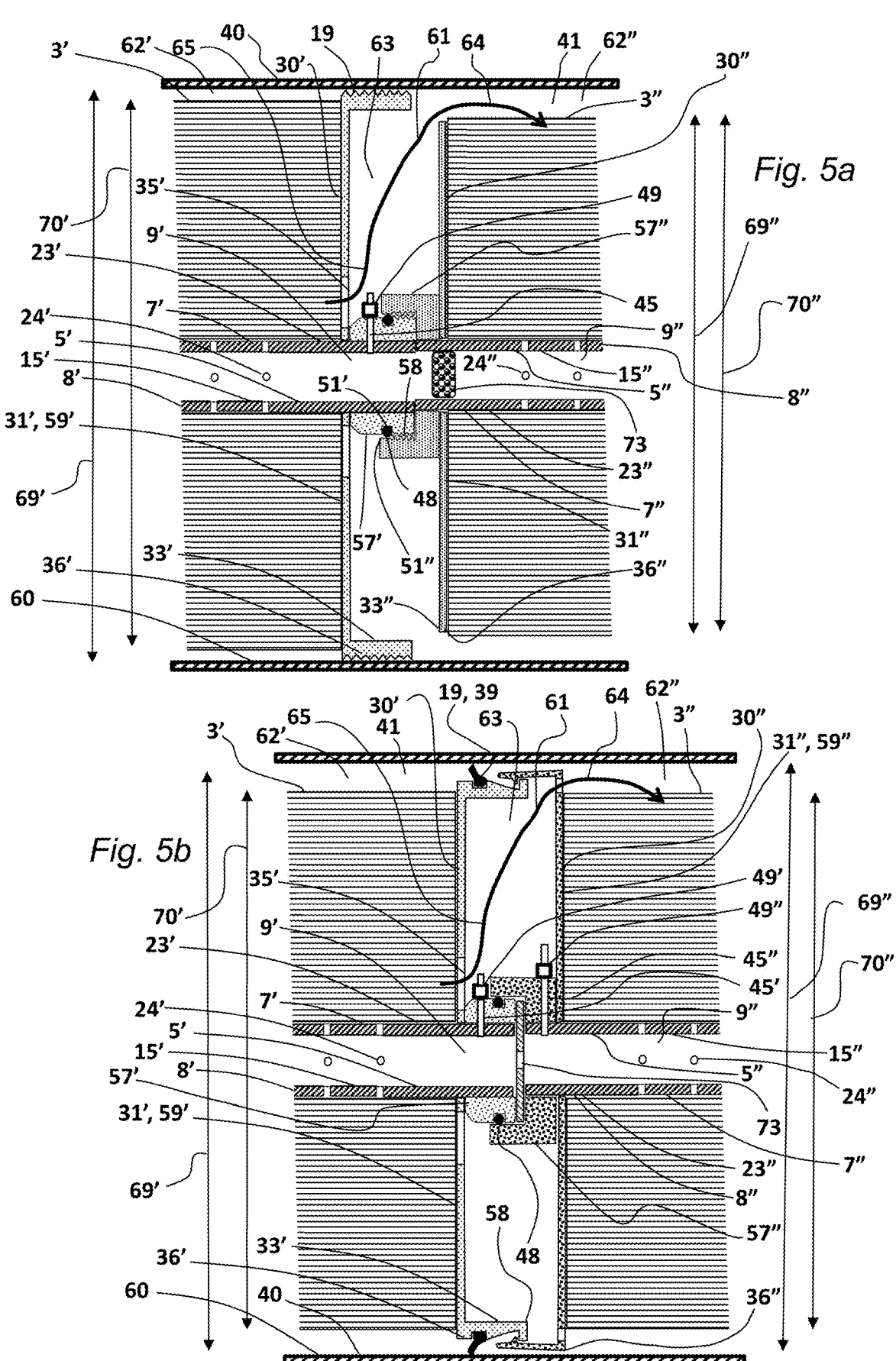
FIGS. 5*a*, 5*b*, and 5*c* show cross sections through three different pairs of adjacent endcap assemblies that each further comprise at least one conducting conduit that passes through an inner ring of an endcap assembly and connects the interior cavity of the permeate collection tube to a differential pressure sensor. Each figure illustrates a feed fluid access pathway that includes an opening near the center of one scroll face and a peripheral path around the other scroll face.
Figures 5C, 5D:
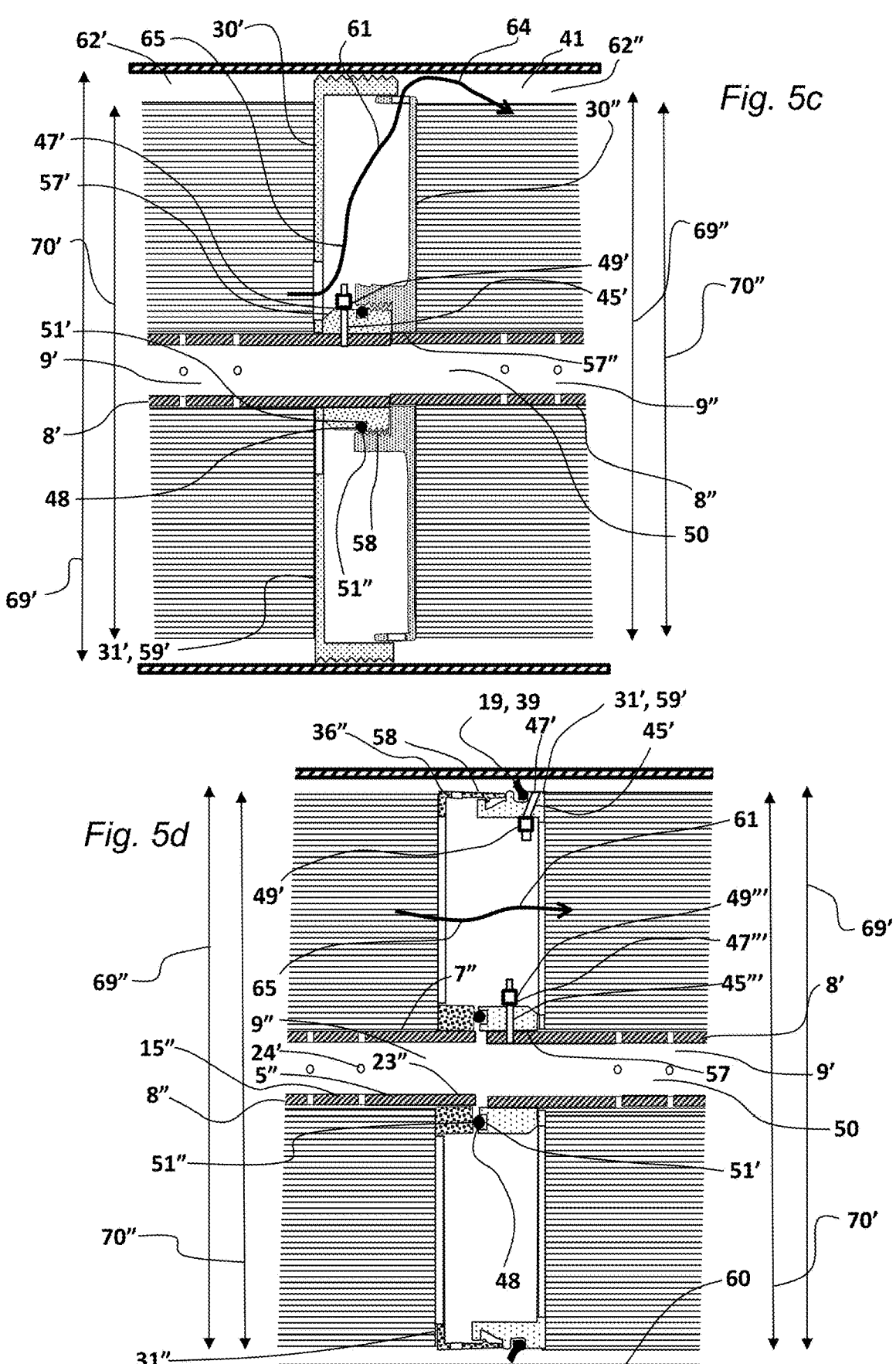
FIG. 5*d* is a cross section of two adjacent endcap assemblies and a feed fluid access pathway that passes both between and through the adjacent scroll faces. Two different connecting conduits pass radially through each of an inner ring and an outer ring, each connecting conduit being fluidly connected to a differential pressure sensor.

In preferred embodiments, adjacent endcap assemblies (31', 31") are configured and arranged to enable a peripheral path (64) around the second scroll face (30") that fluidly connects the central region (63) and a second peripheral space (62"), wherein the second peripheral space (62") is located between the second outer peripheral surface (3") of the second spiral wound module (2") and the inner peripheral surface (60) of the chamber (41); In FIGS. 5*a*, 5*b*, and 5*c*, the outer peripheral surfaces (3") of the second spiral wound modules (2") are porous and the peripheral path (64) is part of the feed fluid path (61) between feed channels (6', 6") of the adjacent modules.

Other preferred embodiments relate the relative resistance to water flow between different regions. For adjacent first and second spiral wound modules (2', 2") with adjacent endcap assemblies (31', 31") on corresponding scroll faces (30', 30"), one can determine pressure differences and volumetric flow rates for bypass (around the scroll face) between adjacent regions. Consider three regions: a) a first peripheral space (62') that is radially located between the first outer peripheral surface (3') of a first spiral wound module (2') and the inner peripheral surface (60) of the chamber (41), b) the central region (63) between scroll faces (30', 30") abutting adjacent first and second endcap assemblies (31', 31"), and c) a second peripheral space (62") that is radially located between the second outer peripheral surface (3") of a second spiral wound module (2") and the inner peripheral surface (60) of the chamber (41). One can measure a first resistance to flow of bypass water from the first peripheral space (62') to the central region (63) and a second resistance to flow of bypass from the central region (63) to the second peripheral space (62"). In preferred embodiments, the first resistance to bypass water flow is at least ten times the second resistance to bypass water flow. For purposes of this aspect of the invention, the relative resistances (ΔP/Q) for this volumetric water flow (Q) are measured at 25° C. and under conditions of 0.25 bar (25 Kilopascals, ~3.6 psi) pressure difference (ΔP) between the first peripheral space (62') and the central region (41).

In other preferred embodiments, the first and second peripheral spaces (62', 62") are axially extending conduits with respective thicknesses greater than twice the thickness of feed channel (6', 6") for corresponding spiral wound modules (2', 2"). Moreover, in some embodiments, at least one endcap assembly (31) on a module (2) has a minimum diameter (69) that exceeds the module average diameter (70) at its axial center (71) by at least four times (more preferably eight times) the feed channel thickness. The minimum diameter (69) is defined as the smallest vessel diameter into which the module could be pushed at 40 pounds force, essentially corresponding to flexible components (e.g. brine seal (39)) being in their most compressed state.

In some preferred embodiments, the endcap assembly (31) comprises a centrally located, axially aligned endcap inner ring (57). The endcap inner ring (57) may be secured and sealed to the permeate collection tube (8) or it may concentrically surround an interconnector tube ((43) shown in FIG. 10) extending from the permeate collection tube (8). In embodiments shown in FIGS. 6a and 7a, the endcap inner ring (57) fits concentrically about the permeate collection tube (8). The endcap inner ring (57) may be secured by way of tight concentric fit, adhesive, welding, or the like. In preferred embodiments, at least one aperture (35) between an inner ring (57) and outer ring (33) provides a feed fluid access pathway with the module (2).

Figure 7A:
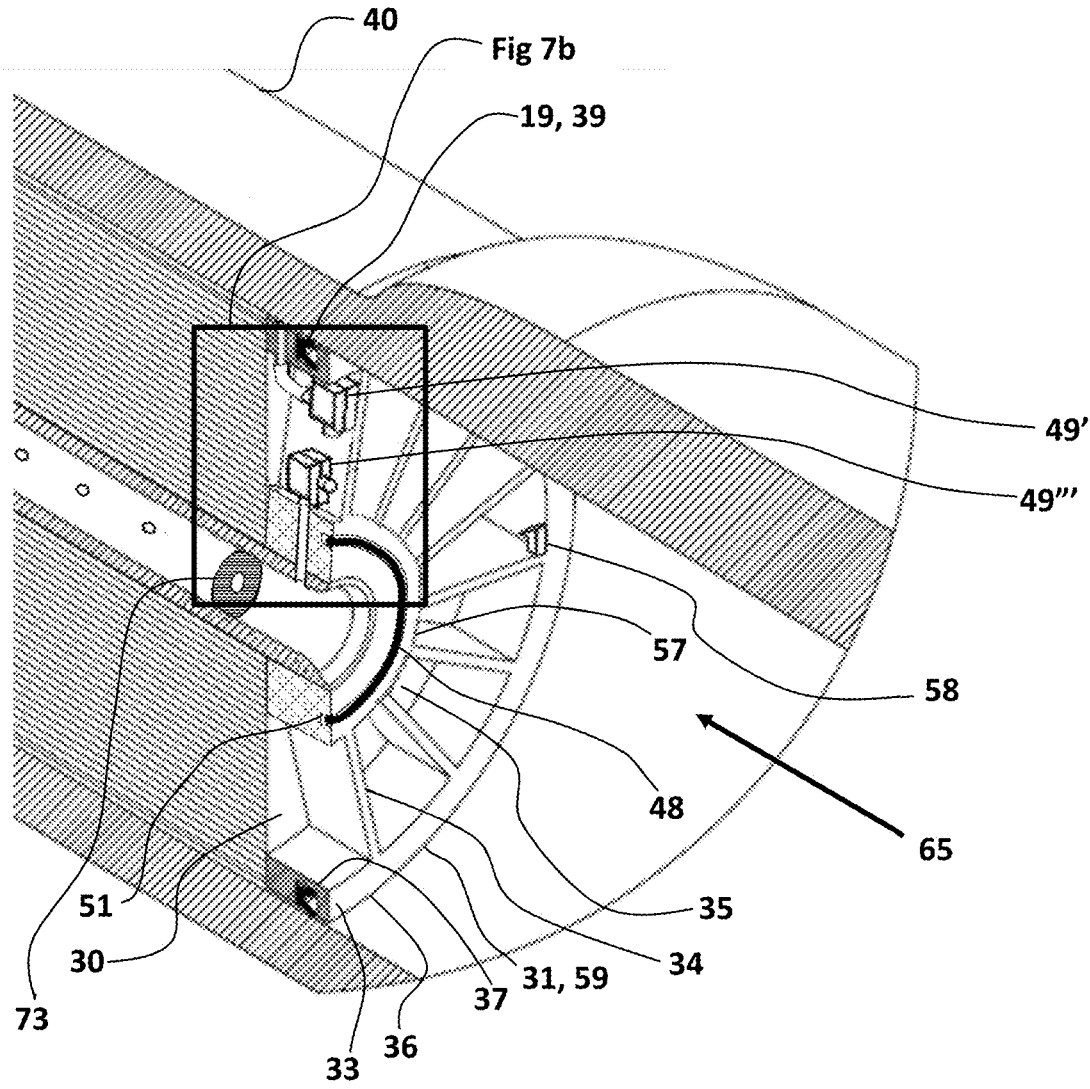
FIG. 7*a* is a cutaway view of a spiral wound membrane module that includes two connecting conduits that each fluidly connect to a differential pressure sensor. A permeate flow restrictor is located within the interior cavity of the permeate collection tube, between the sealing member and the porous section of the permeate collection tube.

In both FIGS. 6a and 7a, the endcap inner ring (57) is connected to an outer ring (33) by a plurality of radially extending supports (34), e.g. "spokes", and the supports (34) shown are separated by endcap apertures (35) that provide a feed fluid access pathway (65) with the module (2), e.g. liquid flow into or out of that scroll face (30) of the module (2) depending upon the module orientation relative to the direction of feed flow. A representative feed fluid access pathway (65) is generally indicated by a solid arrow. Representative examples of hub and spoke endcaps are described in U.S. Pat. Nos. 5,128,037, 5,851,267, 6,632,356, 8,425,773 and WO2014/151695. As also shown especially in FIG. 6b, the outer ring (33) that defines an outer periphery (36) of the endcap can be generally co-extensive with the outer peripheral surface (3) of the module (2) and includes an annular groove (37) along with a feed flow resistor (19) (e.g. brine seal (39)) located in the annular groove (37) adapted for sealing engagement with the inner peripheral surface (60) of the pressure vessel (40). As previously noted, when located within a pressure vessel, the feed flow resistor (19) restricts fluid from bypassing the module (2) and flowing along the peripheral space (62) between the outer peripheral surface (3) of the module (2) and the inner peripheral surface (60) of the pressure vessel (40). FIGS. 3a, 3b, and 3c already illustrated a few different flow restrictors, and representative examples are described in: U.S. Pat. Nos. 6,299,772, 8,110,016, and WO2017/019282. A variety of types of seals may be used, e.g. O-ring, Chevron seal, U-shaped seal, split ring seal, etc. See for example: U.S. Pat. Nos. 6,224,767, 7,198,719, 8,377,300, 8,388,842, 8,377,300 and 9,381,469.

It is preferred that at least one endcap assembly (31) of a spiral wound membrane module (2) includes a connecting conduit (45) defining a fluid passageway extending radially inward from an outer conduit end (47) located at the outer periphery (36) of the outer ring (33) to an inner conduit end (46) located within the outer ring (33), e.g. at a location adjacent to a support (34) and in fluid communication with the end of the module (2). The outer conduit end (47) is preferably axially located between the feed flow resistor (19) and the opposing scroll face (32) of the module (2), e.g. adapted to be in fluid communication with the peripheral space (62) located between the outer peripheral surface (3) of the module (2) and the inner peripheral surface (60) of the pressure vessel (40). More preferably, the outer conduit end (47) is axially located between the feed flow resistor (19) and the first (i.e. nearest) scroll face (30) of the module. In another preferred embodiment, the endcap assembly (31) is located on the "upstream" end of a module (2) configured for axial feed flow, and the outer conduit end (47) is located "downstream" from the feed flow resistor (19). In a preferred alternative embodiment, the endcap assembly (31) is located on the "downstream" end of a module (2) configured for radial feed flow, and the outer conduit end (47) is located "upstream" from the feed flow resistor (19). In either case, the connecting conduit (45) provides a passageway between the peripheral space (62) and the central region (63) (located between the first and second scroll faces (30', 30")).

Similar openings that allow fluid bypass around the brine seal have been described in: JP05287789, JP62049902, U.S. Pat. Nos. 5,128,037, 7,208,088, 8,778,182 and US2013/0161258. U.S. Pat. No. 8,377,300 illustrates openings in the side of an endcap useful in removing brine seals. As described below, in this invention fluid flow through the connecting conduit (45) is prevented by a barrier suitable for use in measuring differential pressure.

In preferred embodiments, the spiral wound module assembly is characterized by an endcap assembly (31) comprising a microprocessor, an antenna, a LoRa transmitter, and at least one sensor connected to the microprocessor. The microprocessor (79) and LoRa transmitter (80) can be separate and connected, but these components can also be combined in a single module as is demonstrated in the muRata Type 1SJ wireless module. In some embodiments, multiple different sensors are connected to the microprocessor. Differential pressure sensors are illustrated in FIG. 4 through FIG. 8, but many other sensor types can be usefully incorporated in the endcap assembly (31). Appropriate sensors within the endcap assembly (31) may be suitable to measure a value corresponding to pressure, differential pressure, flow rate, conductivity, sound intensity, or light intensity. The LoRa transmitter is suitable to transmit the measured values to a receiver or gateway by providing sequential chirps at a radio frequency between 400 MHz and 1000 MHz.

LoRa (which is short for "Long Range") is a modulation technique derived from chirp spread spectrum (CSS) technology. While a LoRa transmitter may be capable of long distance use (e.g. even more than 1200 km), in preferred embodiments of the invention, the LoRa transmitter and receiver are within the same building and are preferably within a hundred meters. It has been found that LoRa is especially favorable for transmission under water, and can thus more easily transmit a signal from within a spiral wound module that is submerged in a water-filled vessel. The LoRa alliance has defined operating frequencies for the following regions: 902-928 MHz in North America, 867-869 MHz in Europe, 470-510 MHz in China, 920-925 MHz in Korea and Japan, and 865-867 MHz in India. LoRaWAN is a preferred communication protocol to transmit information between LoRa devices. LoRa is described further in (B. O. A. Yousuf, E. Rochester and M. Ghaderi, "Throughput, coverage and scalability of lora lpwan for internet of things," in IEEE/ACM International Symposium on Quality of Service (IWQoS), June 2018), which is incorporated by reference.

Figure 11:
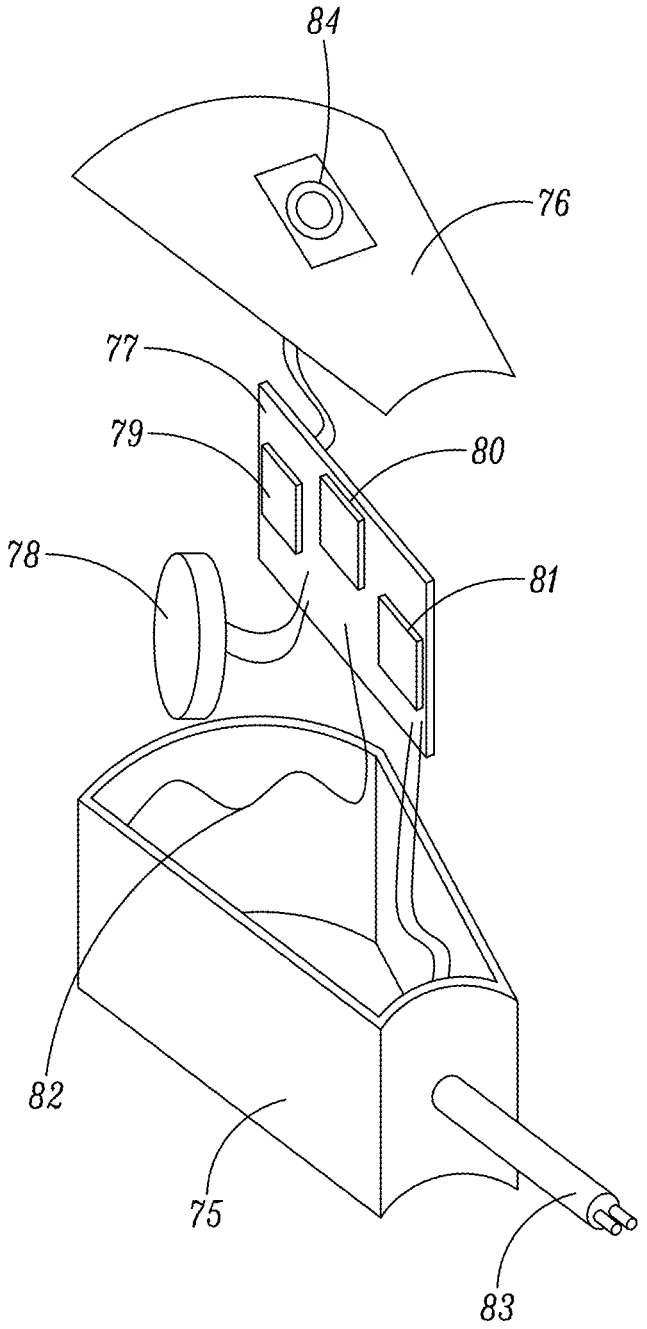
FIG. 11 is an exploded view of a protective housing and the electronic components therein, including a microprocessor, LoRa transmitter, battery, and antenna.

In preferred embodiments, the endcap assembly (31) further comprises a protective housing (90) that encases both a microprocessor (79) and a LoRa transmitter (80). The protective housing (90) is shown in FIG. 11 has two separable parts, a body section (75) and lid section (76). The two separable sections (75, 76) of the protective housing (90) may be reversibly sealed together. In other embodiments, the protective housing (90) is a unitary structure of polymeric thermoset or thermoplastic material (e.g. "potted"). The protective housing (90) is suitable to isolate both the microprocessor (79) and LoRa transmitter (80) from fluid within the endcap assembly (31).

In some embodiments, the protectivity housing further encases a battery, an antenna, or both a battery and an antenna. Inclusion of batteries within the protective housing favors a protective housing that comprises two separable parts that are reversibly sealed together. The protective housing may also encase other electronic components (81) required for the sensor to electrically interface with the central processing unit. (e.g. analog-to-digital converter or comparator). In FIG. 11, a microprocessor (79), LoRa transmitter (80), and other electrical components (81) are mounted on the same printed circuit board (77). Wires connect the battery (78), antenna (82), and sensors (83, 84) to the microprocessor (via the board).

The protective housing may also include sensors. For instance, temperature sensors may not need to contact fluid surrounding the protective housing. In other embodiments, the protective housing surrounds both the sensor and a fluid conduit, wherein the fluid conduit provides a path for fluid between the sensor and a region of the endcap assembly that is external to the protective housing. Locating the sensor within the protective housing can physically support the sensor against high pressures of operation, and the fluid conduit may allow it to measure by contact the properties of the liquid associated with feed and permeate streams. In still other embodiments, wires external to the protective housing may connect the microprocessor to sensors external of the protective housing. Example sensors may include the differential pressure sensors shown in FIG. 4 to FIG. 8, but many other sensor types may also or alternatively be connected to the microprocessor. At least one sensor is connected to the microprocessor, wherein said sensor is suitable to measure a value corresponding to pressure, differential pressure, flow rate, conductivity, pH, sound intensity, or light intensity, and wherein a LoRa transmitter is suitable to transmit said measured valued by providing sequential chirps at a radio frequency between 400 MHz and 1000

MHz. Sensors may be connected directly to a microprocessor (or via an attached printed circuit board) using either direct mounting or wires.

Figure 12A:
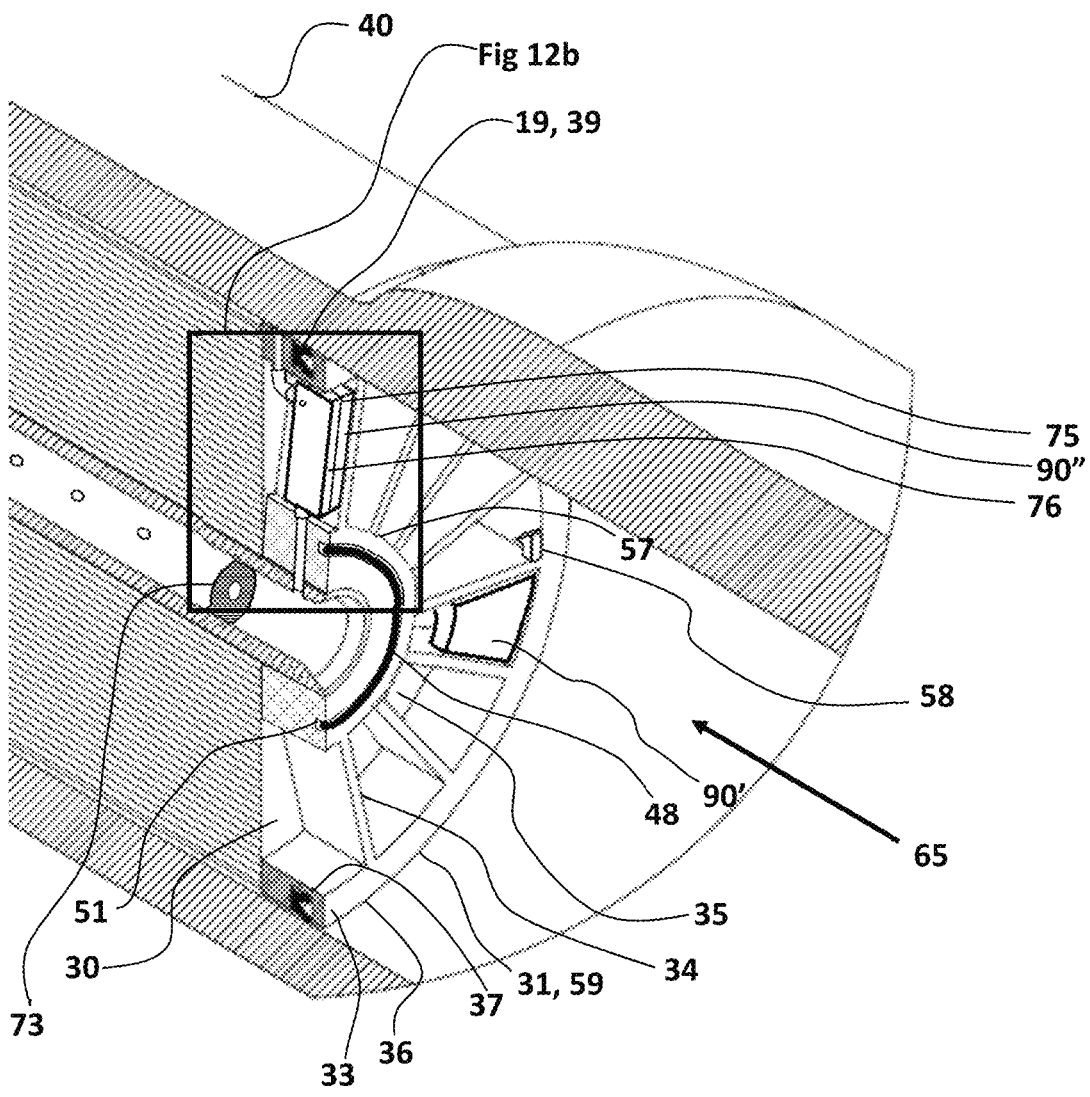
FIG. 12a is a cutaway view of a spiral wound membrane module that includes two protective housings, each suitable for enclosure of the microprocessor and LoRa transmitter. One of the protective housings is wedge-shaped to fit within the region between radially extending supports.
Figure 12B:
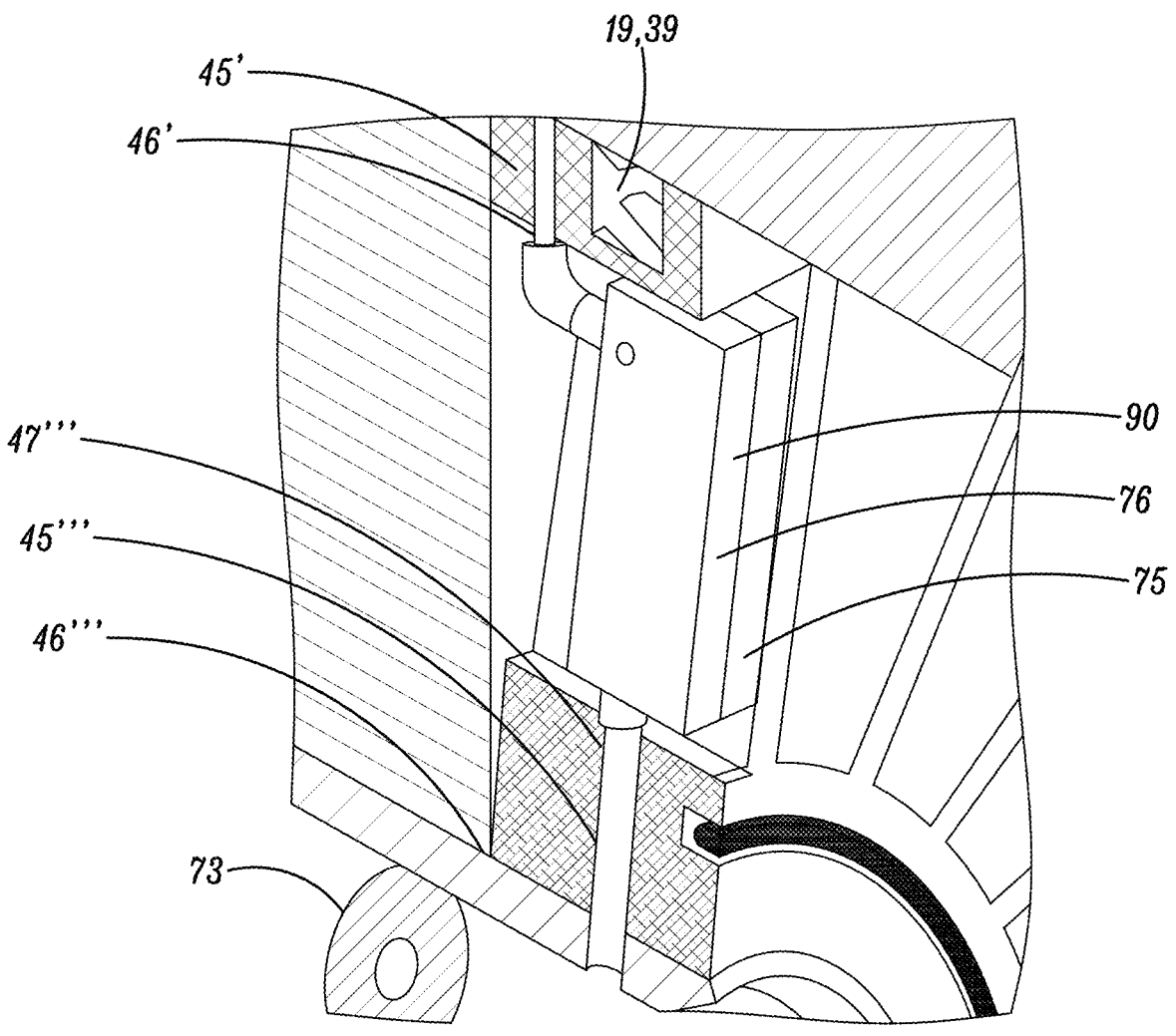
FIG. 12b provides a magnified perspective view of a region in FIG. 12a that includes a protective housing with a nearest surface that is adjacent to the scroll face being offset from the scroll face.

FIG. 12a illustrates two different protective housings. A tapered protective housing (90') fits between radial supports, and is suitable to include the microprocessor, LoRa transmitter, antenna, and at least one sensor connected to the microprocessor. The tapered protective housing (90') is located within the endcap assembly and is adjacent an inner surface of the concentric outer ring (33). FIG. 12a and FIG. 12b both illustrate a second protective housing (90"). The drawing is intended to illustrate a protective housing which may include a different pressure sensor (near top) and another sensor (near bottom) in fluid contact with the permeate solution. Such sensor may reasonably measure pressure, conductivity, or other properties of the permeate solution. In both cases, the protective housing surrounds both the sensor and a fluid conduit within the housing (not shown), wherein the fluid conduit provides a path for fluid between the sensor and a region of the endcap assembly that is external to the protective housing. The fluid conduit may allow it to measure by contact the properties of the liquid associated with feed and permeate streams.

The endcap assembly (31) can include an outer ring (33) that defines an outer periphery (36) of the endcap assembly (31) and surrounds a feed fluid access pathway (65) connected to the feed channel (6). A protective housing located within the endcap assembly may be adjacent an inner surface of the concentric outer ring (33). In other embodiments, the protective housing is located within the endcap assembly and may be secured to either i) an inner surface of the concentric outer ring (33) or ii) a support (34) that extends radially from an inner ring (57) of the endcap to an outer ring (33) of the endcap. In some embodiments, the protective housing has a nearest surface adjacent to the scroll face, and the majority of said nearest surface is at least 2 mm from the scroll face. For instance, the nearest surface may contain projections that touch the scroll face, but there is a space between the majority of the nearest surface that enables liquid to flow through that region of the scroll face.

Sensors may be located inside or outside of a protective housing, or they may be attached to the outer surface of the protective housing. FIG. 11 illustrates a conductivity sensor (83), and this sensor comprises at least two electrodes that are attached to the outer surface of the protective housing. FIG. 11 also illustrates a pressure sensor (84). In another embodiment, not illustrated in FIG. 11, at least two insulated wires protrude from the protective housing and connect the microprocessor to the sensor.

In a preferred embodiment, an instrumented endcap (59) is formed by connecting a differential pressure sensor (49) to the fluid passageway of the connecting conduit (45). The differential pressure sensor is adapted to measure pressure difference between an endcap aperture (35) inside the outer ring (33) of the module endcap assembly (31) and a region of the peripheral space (62) between the feed flow resistor (19) (e.g. brine seal (39)) and the opposite scroll face (32) of the module (2). This allows a measurement of difference in pressure across the feed flow resistor (19) and approximates the difference in pressure between opposite ends of the module (2), e.g. between opposite scroll faces (30, 32). In preferred embodiments, the endcap assembly (59) has an outer ring (33) that encompasses part of the central region (63), and the differential pressure sensor (49) is located within the outer ring (33). The differential pressure sensor (49) is preferably located and attached within a region surrounded by the endcap assembly (31), e.g. secured to the endcap assembly such as to an inner surface of the concentric outer ring (33) or to one of the supports (34). In this way, the outwardly facing surface of the endcap assembly (31) remains unobstructed and can be secured against an endcap assembly of an adjacently positioned spiral wound membrane module. In some embodiments, the differential pressure sensor (49) is encased or "potted" within a protective polymeric resin (e.g. thermoset or thermoplastic material), thus enabling it to function at feed pressures exceeding 10 bar (1000 Kilopascal), more preferably exceeding 15 bar, or even exceeding 20 bar. Preferred potting materials include urethanes, epoxies and hot melts. In preferred embodiments, the differential pressure sensor (49) may include two ports, one of which is joined to the connecting conduit (45) in fluid communication with the peripheral space (62) between the feed flow resistor (19) and the opposing scroll face (32) of the module (2), and another port in fluid communication with an endcap aperture (35) inside the outer ring (33) of the module endcap assembly (31). When two modules (2) are adjacently position within a vessel, a port of the differential pressure sensor (49) and the endcap aperture (35) are both in fluid communication with a central region (63) between adjacent first and second scroll faces (30', 32") that includes a feed fluid access pathway (65). (The term "port" associated with the differential pressure sensor is not intended to convey a physical structure, but rather a location for providing one of two different pressure inputs.)

In another embodiment, the endcap assembly (31) on a spiral wound module (2) may include an inner ring (57) that is sealed to the hollow permeate collection tube (8) to prevent leakage therebetween. The inner ring (57) comprises a seal surface (51). A connecting conduit (45), located axially between the sealing member (48) and the scroll face (30), passes radially through the inner ring (57) and is fluidly connected to the interior cavity of the hollow permeate collection tube. The sealing member is suitable to compress a sealing member (48) against a seal surface located on an adjacent module, joining their respective interior cavities to create a combined permeate collection rejection. As in embodiments described earlier, a differential pressure sensor (49) is attached to the endcap assembly (59) and fluidly connected to both the connecting conduit (45) and the feed fluid access pathway (65). This enables a measurement of net-driving pressure, near the permeate tube at one end of the module, and this localized measurement can be useful parameter for identifying the impact of pressure drop on module performance.

When adjacent spiral wound modules are present, an instrumented endcap assembly (59), one containing the connecting conduit and differential pressure sensor, may be located on the either the first or second adjacent module. This is independent of flow direction, the presence of a feed flow resistor (19) on one module, or the feed fluid pathway (61). It is important, however, that the connecting conduit (45') is located axially between the sealing member (48) and the scroll face (30) of the instrumented endcap assembly (59).

Endcap assemblies (31) have been described to measure differential pressures associated with both feed-side pressure drop and transmembrane pressure at a specific location in the module. In fact, there is advantage to combining previously described embodiments and having two connecting conduits (45', 45"') within the same instrumented endcap assembly (31'). (See FIG. 5a, 7a, 7b.) To provide separate measurements, one conduit (45') may be in fluid connection with the peripheral space (62) and the other (45"') fluidly connected with the interior cavity (9) of the permeate collection tube (8). As previously described, both conduits will be in fluid communication with separate differential pressure sensors (49', 49"'), which separate a conduit end from the central region (63). Co-locating two differential pressure sensors (49) on a single endcap assembly simplifies electronics and communication, potentially using a common microprocessor, battery, and/or antenna. Further, in some embodiments, two separate connecting conduits (45, 45"') may be colinear, facilitating manufacturing.

Figure 7B:
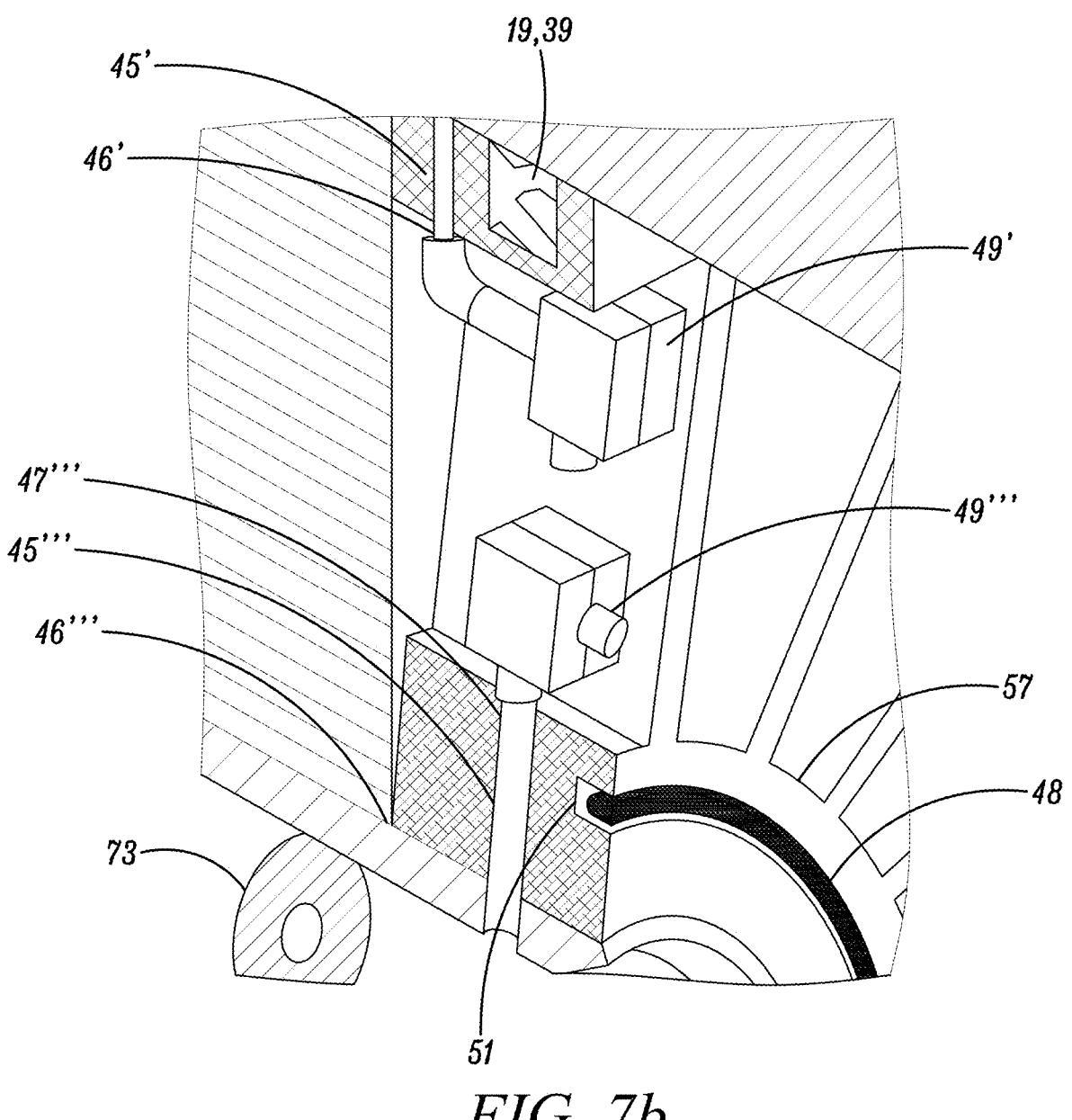
FIG. 7*b* provides a magnified perspective view of a region in FIG. 7*a*.

Particularly in the presence of a differential pressure sensor for measuring the difference in pressure between the combined permeate collection region (50) and the central region (63), there can be advantage in introducing a permeate flow restrictor (73) into the combined permeate collection region (50). Permeate flow restrictors may span a majority of the permeate cavity (8) of a module (2), or be localized. Most preferably, the permeate flow restrictor (73) is axially located between the first porous center section (15') of a first module (2') and the second porous center section (15") of an adjacent second module (2"). FIG. 5a illustrates a flow restrictor formed from packed media, where FIGS. 5b and 7b illustrate orifice plates. Localized flow control valves (US 2015/029140) and longitudinal mixers (U.S. Pat. No. 6,190,557) down the axis X of the module are also possible. In preferred embodiments, the permeate flow restrictor (73) provides flow channel(s) that are decreased by at least a factor of two compared to the inner diameter of the permeate collection tube (8). In other embodiments, the flow restrictor (73) provides a resistance to water flow ($\Delta P/Q$) that is increased by at least a factor often, as compared to the resistance for the same length of permeate collection tube, where resistances to water flow are inversely proportional to water flow (Q) measured at 25° C. and 1 kilopascal pressure drop ($\Delta P$). Effective use of permeate flow restrictors (73) can be supported by novel methods of pressure measurement, as described herein.

Modules (2) having instrumented endcap assemblies, as described herein, may be used with spiral wound modules configured for axial feed flow or with modules configured for radial feed flow. The latter is less understood and pressure measurement devices would be helpful in optimal operation. In a preferred spiral wound module assembly (21) having two adjacent spiral wound modules (2', 2"):

the first and second outer peripheral surfaces (3', 3") are porous and in fluid communication with first and second feed channels (6', 6") of first and second spiral wound modules (2', 2"), respectively;

the first endcap assembly (31') covers at least 75% of the first scroll face (30') and is suitable to restrict at least 75% of feed flow through the first scroll face (30') to open areas located closer to the first permeate collection tube (8') than to the first outer peripheral surface (3'); and the second endcap assembly (31") covers at least 75% of the second scroll face (30") and is suitable to restrict at least 75% of feed flow entering the second spiral wound module (2") to entering the second feed channel (6") through the second outer peripheral surface (3").

Figure 8:
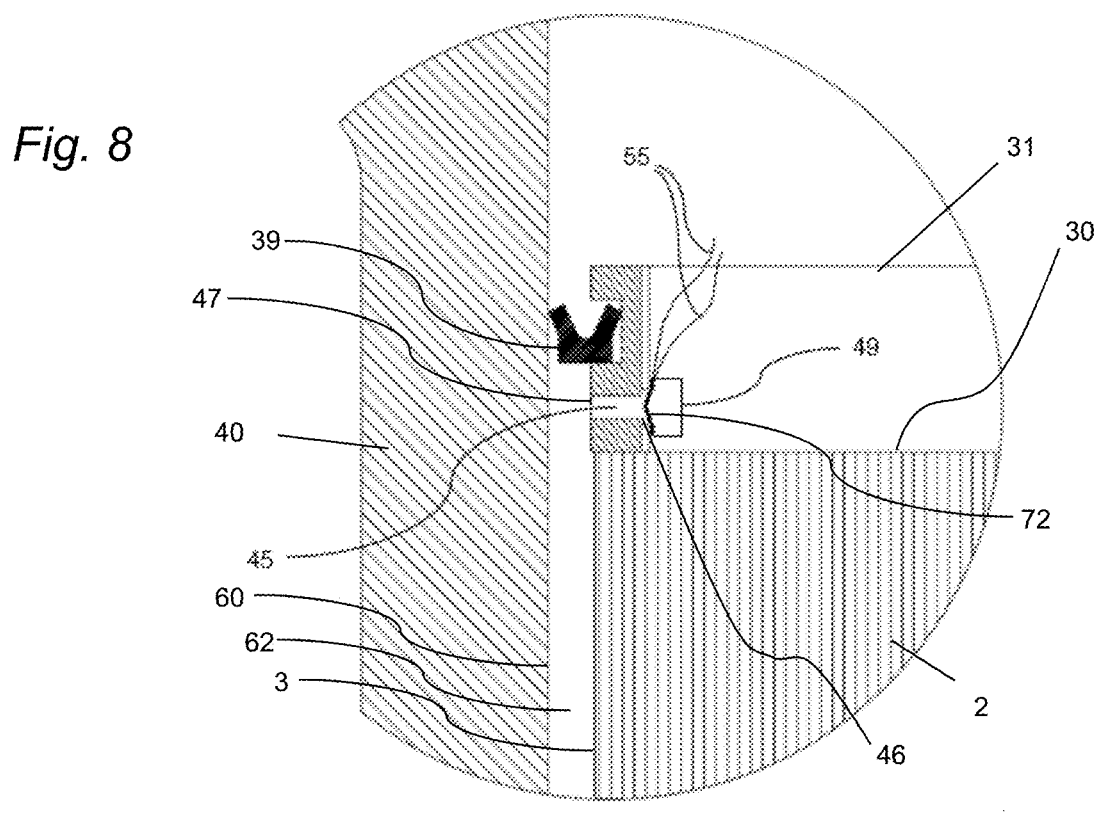
FIG. 8 is a cross-sectional view showing another embodiment of an endcap assembly showing another embodiment of a pressure sensor including a stretchable film that prevents flow through the connecting conduit and includes a resistive strain gauge.
Figure 9:
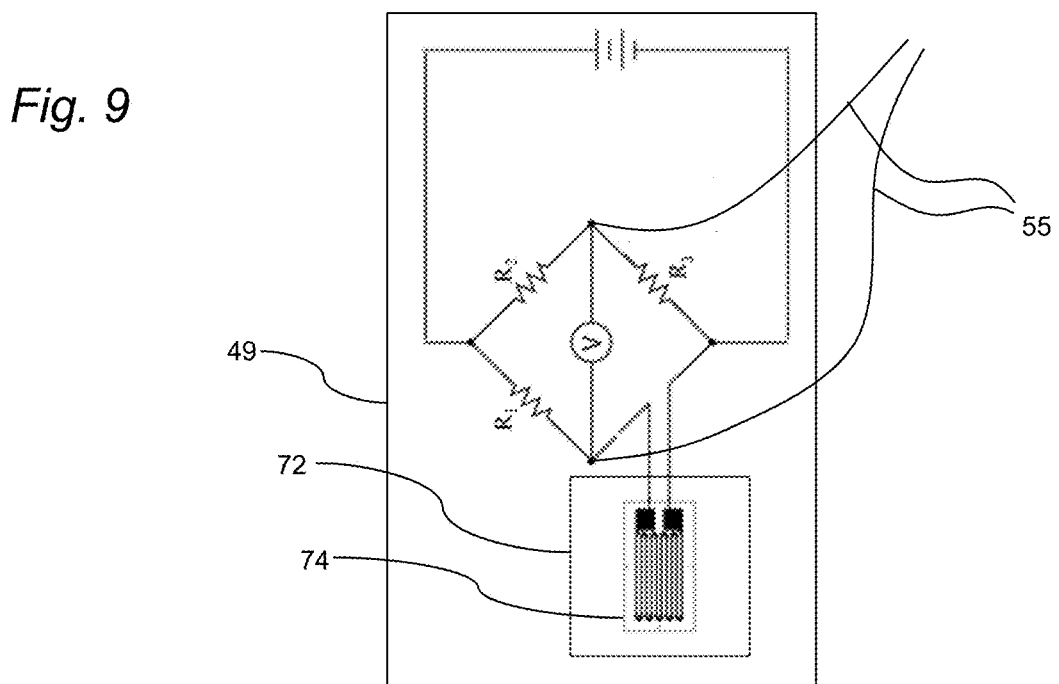
FIG. 9 is a schematic view showing an electrical circuit applicable to the subject pressure sensor.

With reference to FIGS. 8 and 9, the differential pressure sensor (49) may include power and signal leads or wires (55) in communication with one or more of an external power source, antenna, and microprocessor. In some embodiments, power or signal leads (55) may extend from the differential pressure sensor (49) through the feed inlet port (42), concentrate outlet port (42'), or permeate outlet port (44) to an externally located device, such as a micro-processing unit. In other embodiments, leads (55) transmitting power or signal (e.g. via voltage, current, light etc.) may extend from the differential pressure sensor (49) to such a device (e.g. micro-processing unit not shown) located within the vessel (40) (e.g. central region (63) or gap space (56, 56')). Most preferably, a microprocessor may be attached to the instrumented endcap assembly (59). If not powered by an external source, the sensor may include an internal battery (e.g. coin cell) as a source of power, utilize energy harvesting (e.g. from vibrations, electromagnetic waves, or water movement), or be passive using energy from an interrogating source to supply a signal. Sensors may communicate to the signal processor by way of radio, light or other means that do not require a physical lead or wire. Alternatively, the sensor (49) may communicate with another micro-processing unit or sensor located within the pressure vessel (e.g. gap space (56) shown in FIGS. 3 and 10) that in turn communicates with an externally located device (e.g. micro-processing unit). Means of communication inside and outside the vessel may be wired or wireless, that latter including NFC, Bluetooth, Bluetooth BLE, ZigBee, Zwave, LoRa, WiFi, Flexnet, and SIGFOX.

In a preferred embodiment, the differential pressure sensor (49) includes a deformable barrier (72) (e.g. diaphragm) to provide simple, reliable, and low cost means to measure differential pressure. The deformable barrier (72) prevents convective flow through the connecting conduit (45). It prevents fluid flow between the fluid passageway of the connecting conduit (45) and the feed fluid access pathway (65). In some embodiments, the differential pressure sensor (49) separates the endcap aperture (35) inside the outer ring (33) of the module endcap assembly (31) from a region of the peripheral space (62) between the feed flow resistor (19) and the opposing scroll face (32) of the module (2). In other embodiments, the differential pressure sensor separates the endcap aperture (35) inside the outer ring (33) of the module endcap assembly (31) from the interior cavity (9) the permeate collection tube (8). Pressure difference across the deformable barrier (72) may result in a change in measurable electrical properties (e.g. resistance, capacitance) and this component may be integrated into electronic circuits to provide a measurement of the differential pressure. Alternatively, deformation of the barrier layer may be detected optically (e.g. by camera or by its deflection or scattering of light) or through modulation of sound. A deformable barrier (72) may also include an antenna that modulates electromagnetic waves to enable passive measurement of different pressure.

Examples of powered differential pressure sensors include Omega's PX26-001DV, Dwyer 629C-02-CH-P2-E5-S1, and Cole-Parmer EW-68071-52. These differential pressures sensors contain two ports for connection to regions of different pressures. A first port may be provided in fluid communication with an endcap aperture (35) inside the outer ring (33) of the module endcap assembly (31). A second port may be in sealing engagement with the inner conduit end (46) of the connecting conduit (45). This type of configuration is illustrated in FIG. 6b and is adapted to measure differences in pressure between the outer end (47) of the connecting conduit (45) and a nearest scroll face (30) of the module (2). While measured at a single end of the module, this pressure difference approximates the pressure difference between fluid upstream of the module and downstream of the module.

In another embodiment, a strain gauge (74) (e.g. Omega's SGD-LY series) including oriented metal wires on a stretchable film (72) is provided in fluid communication with the connecting conduit. This embodiment is illustrated in FIGS.

8 and 9. Due to this stretching, an increased difference in pressure between regions upstream and downstream of the feed flow resistor results in an increase in the strain gauge resistance. Electrical circuits, which may be incorporated as part of the sensor (49), allow modified electrical properties to be converted to signals read by a micro-processing unit. For example, the quarter-bridge strain gauge circuit depicted in FIG. 9 enables a modified resistance in the strain gauge (74) to be converted to voltage difference, and a powered micro-processing unit may read this and provide corresponding output. (In the illustrated case, wires (55) may be connected to an amplifier, A2D, or to the analog input pins of a micro-processing unit.) Alternatively, the change in electrical resistance may be used in an antenna circuit to modulate radio waves and provide a passive (without internal power) measurement of differential pressure. In preferred embodiments, the resistive element is preferably encapsulated within plastic to isolate it from surrounding solutions.

In still another embodiment, deflection of a film including an antenna may be used to detect differential pressure. For example, Drazan, J F., et al., *Archimedean spiral pairs with no electrical connections as passive wireless implantable sensors*, J. Biomedical Technology and Research, 2014, 1(1):, page 8; describes a pressure sensor formed from two adjacent spiral antenna, separated by a compressible media. In a variation of this embodiment, an antenna within a deformable barrier (72) may be in fluid communication with the connecting conduit (45) and its distance from a second fixed antenna varies with the differential pressure. In this passive sensor, a radio wave is applied, and the returning signal is modulated by the distance between the two antenna segments.

When used, the sensor is preferably packaged to isolate degradable components from liquid but allow it to contact pressure on opposing sides. Thin and flexible liquid barrier layers that separately contact the two surfaces (and surround these degradable components) can be sufficient for this purpose. Degradable components used to measure pressure drop that may be contained within the barrier layers include electrical components, resistors, capacitors, or antennae.

The types of micro-processing units are not particularly limited and applicable examples include an autonomous integrated circuit as AD5931 from Analog Devices and integrated circuits such a model CC2(3)0 or CC2530 from Texas Instruments. Further examples include Arduino and Raspberry Pi boards. The micro-processing unit preferably includes flash memory for storing protocol, control functions, and data. The micro-processing unit may be secured to at least one of the endcap assembly (31), the permeate adapter tube (52), and the removable end plate (54). When located within the pressure vessel, the micro-processing unit may be encapsulated in potting material. Preferably, the micro-processing unit is surrounded by the endcap assembly (31). More preferably, the endcap assembly comprises a protective housing and both a microprocessor and a LoRa transmitter within that protective housing.

In a preferred embodiment, one or more (e.g. 3-10) spiral wound membrane modules (2) are housed within a pressure vessel (40), collectively referred to as a "spiral wound module assembly" (21). The vessel (40) includes a feed inlet port (42), concentrate outlet port (42'), and permeate outlet port (44). The feed inlet port (42) is adapted for connection with a pressurized source of feed liquid. The concentrate outlet port (42') is adapted for connection to a pathway for re-use or disposal. The permeate outlet port (44) is adapted for connection to a pathway for storage, use, or further treatment. Pressure vessels (40) used in the present invention are not particularly limited but preferably include a solid structure capable of withstanding pressures associated with operating conditions. The vessel structure preferably includes a chamber (41) having an inner peripheral surface (60) of similar size and shape to that of the outer peripheral surface (3) of the spiral wound membrane modules to be housed therein. The orientation of the pressure vessel is not particularly limited, e.g. both horizontal and vertical orientations may be used. Examples of applicable pressure vessels, module arrangements and loading are described in: U.S. Pat. Nos. 6,074,595, 6,165,303, 6,299,772 and US 2008/0308504. Manufacturers of pressure vessels for large systems include Pentair of Minneapolis MN, Bekaert of Vista CA and Bel Composite of Beer Sheva, Israel.

Figure 10:
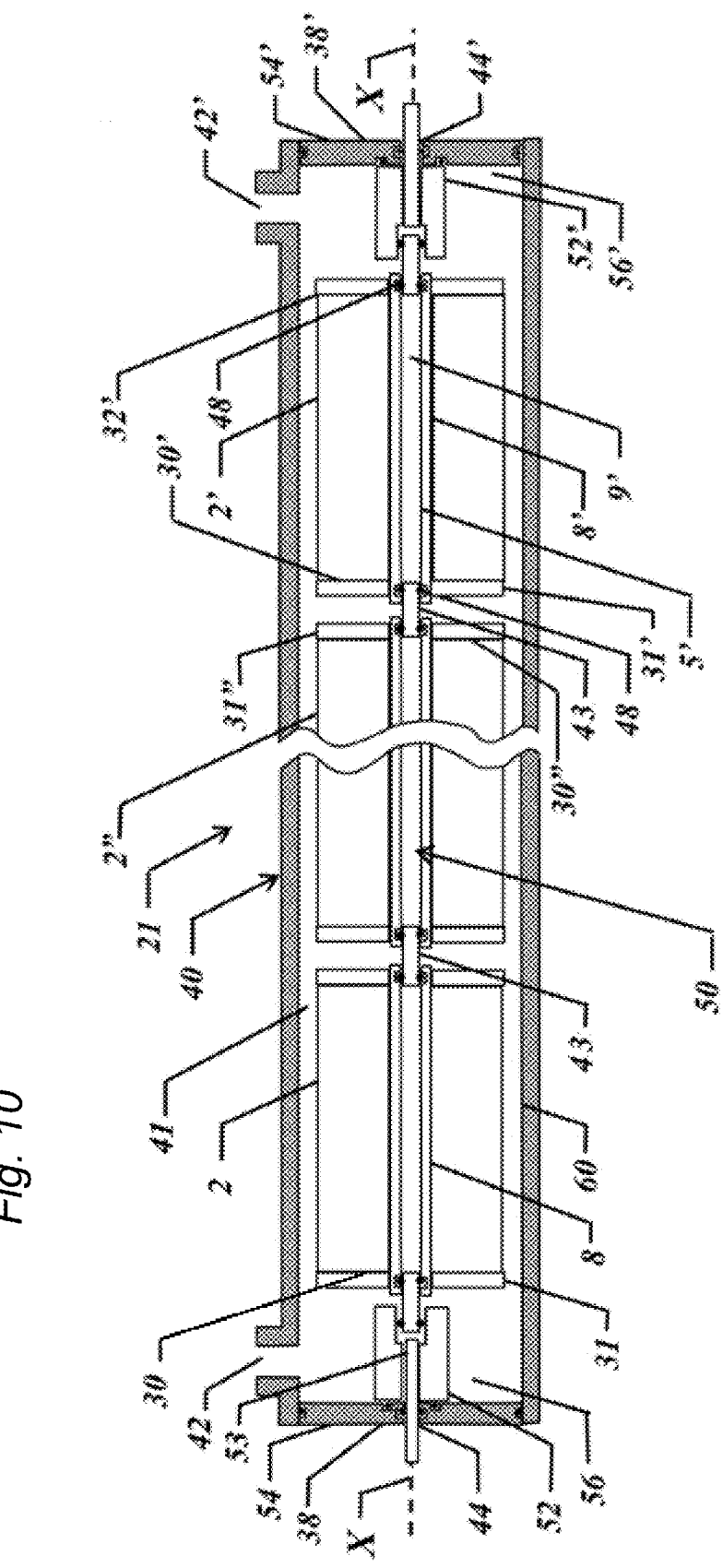
FIG. 10 is a cross-sectional view of a spiral wound membrane module assembly including a plurality of spiral wound membrane modules axially aligned in a serial relationship within a pressure vessel. To facilitate description, the features of endcap assemblies are not shown.

A typical embodiment of a spiral wound membrane module assembly is generally shown at 21 in FIGS. 3 and 10. To facilitate description of other features, details of endcap assemblies (31), including the feed flow resistor (19) and pressure sensor (49) are not shown. As shown, the assembly includes a plurality of spiral wound membrane modules (2) axially aligned (along axis X) in a serial arrangement within a pressurizable chamber (41) of a pressure vessel (40). The chamber (41) includes an inner peripheral surface (60) that encloses the modules (2). FIG. 10 shows how the permeate collection tubes (8) of adjacent modules (2) may be joined by interconnector tubes (43) that include compressed sealing members (48). Alternatively, interconnector tubes (43) between adjacent modules (8', 8") are not required if a seal surface (51') on an inner ring (57') of an endcap assembly (31') is provided (See FIG. 7a) suitable to compress a sealing member (48) and mate with an adjacent element (8") to isolate the interior of a combined permeate collection region (50) from the feed flow pathway (61). In either case, the effect of the joined tubes (8) is to define a combined permeate collection region (50) for the vessel (40). The pressure vessel (40) extends along a central axis (X) between a first and second vessel end (38, 38'). The vessel (40) includes at least one removable end plate (54) located at one end (38, 38') of the vessel (40). Removal of the vessel end plate (54) allows the chamber (41) to be loaded and unloaded with modules (2). In typical embodiments, removable vessel end plates (54, 54') may be located at both vessel ends (38, 38'). The vessel (40) includes several fluid ports (42, 42', 44, and 44'), e.g. at least one feed inlet port (42), concentrate outlet port (42') and permeate outlet port (44). Additional ports may be included, e.g. feed inlet ports, concentrate outlet ports and permeate outlet ports (44, 44') at each end (38, 38') of the vessel. Similarly, the feed inlet and concentrate outlet ports may be provided in reversed orientation from that shown in FIG. 3 or 10. For simplicity of description, the feed inlet and concentrate outlet ports may be generically referenced by port (42/42'). While ports (42, 42') are shown in a radial configuration relative to the chamber (41), one or more feed and concentrate ports may assume an axial configuration extending through the ends (38, 38') of the vessel (40). A gap space (56, 56') is located within the chamber (41) between the ends (38, 38') of the vessel (40) and nearest module (2, 2').

As shown, permeate adapter tubes (52) may be located at either or both ends (38, 38') of the vessel (40) in fluid communication with the permeate collection tube (8) of the nearest axially aligned spiral wound membrane module. For example, a permeate adapter tube (52) may be provided in sealed fluid communication with the permeate collection tube (8) of the first spiral wound membrane module (2) and the permeate outlet port (44). In preferred embodiments, the permeate adapter tube (52) comprises a hollow conduit (53) that defines a sealed passageway for permeate to pass from the first spiral wound membrane module (2) to a permeate outlet port (44, 44'), e.g. from the permeate collection region (50) to exit the vessel (40). In the embodiments of FIGS. 3 and 10, gap spaces (56, 56') are shown near both ends (38, 38') of the vessel (40) along with corresponding permeate adaptor tubes (52, 52'). The permeate adapter tube (52) may be a single integral unit or it may comprise a plurality of parts that join to form a unit sealing to both the nearest module (2, 2') and the permeate outlet port (44).

With reference to FIG. 10, three or more modules are preferably located within a pressure vessel (40) wherein the first (lead) module (2) is located adjacent the first vessel end (38), the second (terminal module (2') is located adjacent the second vessel end (38'), and other modules (2") are located between these first and second modules. At least one endcap assembly (31) of at least one spiral wound membrane module within the vessel (40) includes the previously described connecting conduit (45) and differential pressure sensor (49). In one preferred embodiment, only one of the first module (2) or second (last) module (2') within the vessel (40) includes an endcap assembly (31) with the connecting conduit (45) and differential pressure sensor (49). In other embodiments, both the first and last spiral wound membrane modules within a pressure vessel (40) include the subject endcap assembly (31) including the previously described connecting conduit (45) and differential pressure sensor (49). This approach permits the early detection of biofouling which typically first occurs in the first (most upstream) module and scaling which typically first occurs in the last (most downstream) module. Alternatively, other modules within the assembly, or all the modules of the assembly may include the subject endcap assembly and differential pressure sensor. An endcap assembly (31) containing the connecting conduit (45) and differential pressure sensor (49) may be located on either end of a module (2, 2'). However, for the first and last spiral wound membrane modules within a pressure vessel (4), locating it on an endcap assembly (31) nearest the gap space (56, 56') can facilitate removal of signal. In preferred embodiments, the pressure sensor (49) may communicate (e.g. via wires, light, or sound) with a micro-processor located within the gap space (56, 56'). In other preferred embodiments, values associated with sensor measurements may be transmitted out of water-filled pressure vessel using a LoRa transmitter that is connected to a microprocessor.

The invention includes spiral wound membrane modules, related assemblies including multiple spiral wound modules, and different operations of these devices. Different embodiments are described which include module and vessel geometries more suitable to radial or axial flow, instrumented endcap assemblies useful for comparing the differential pressure between the feed fluid access pathway (or central region (63)) and either the interior cavity of the permeate collection tube (9) or the peripheral space (62) between the module (2) and vessel (40), different types of feed flow resistors (19), and the inclusion of different permeate flow restrictors (73). It is intended that different described features on embodiments may be combined. Further, many embodiments of the invention have been described and in some instances certain embodiments, selections, ranges, constituents, or other features have been characterized as being "preferred." Such designations of "preferred" features should in no way be interpreted as an essential or critical aspect of the invention. Expressed ranges specifically include end points.

The invention claimed is:

1. A spiral wound module comprising:
a) at least one membrane envelope wound about a hollow permeate collection tube to form a cylinder with first scroll face, an opposing scroll face, and an outer peripheral surface,
b) a porous center section of the permeate collection tube located axially between a first distal section of the permeate collection tube near the first scroll face and an opposing distal section of the permeate collection tube near the opposing scroll face, wherein the porous center section contains holes that pass from the inside surface to the outside surface of the permeate collection tube and that connect a permeate channel within the membrane envelope to the interior cavity of the hollow permeate collection tube,
c) a feed channel adjacent to the membrane envelope, wherein the feed channel is suitable to enable feed flow through the spiral wound membrane module between the first scroll face and the opposing scroll face,
d) at least one endcap assembly affixed to the spiral wound module adjacent said first scroll face;
wherein the spiral wound module is characterized by the endcap assembly comprising a microprocessor, an antenna, a LoRa transmitter, and at least one sensor connected to the microprocessor, wherein said sensor is suitable to provide a measured value corresponding to pressure, differential pressure, flow rate, conductivity, pH, sound intensity, or light intensity, and wherein said LoRa transmitter is suitable to transmit said measured value by providing sequential chirps at a radio frequency between 400 MHz and 1000 MHz.

2. The spiral wound module of claim 1 wherein the endcap assembly further comprises a protective housing that encases both the microprocessor and LoRa transmitter and said protective housing is suitable to isolate the microprocessor and LoRa transmitter from fluid within the endcap assembly.

3. The spiral wound module of claim 2 wherein the protective housing comprises two separable parts that are reversibly sealed together.

4. The spiral wound module of claim 2 wherein the protective housing further encases a battery and an antenna.

5. The spiral wound module of claim 2 wherein the protective housing is a unitary structure of polymeric thermoset or thermoplastic material.

6. The spiral wound module of claim 2 wherein said endcap assembly includes an outer ring that defines an outer periphery of the endcap assembly and surrounds a feed fluid access pathway connected to the feed channel; and wherein the protective housing is located within the endcap assembly and is adjacent an inner surface of the concentric outer ring.

7. The spiral wound module of claim 2 wherein the protective housing is located within the endcap assembly and secured to either i) an inner surface of the concentric outer ring or ii) a support that extends radially from an inner ring of the endcap to an outer ring of the endcap.

8. The spiral wound module of claim 2 wherein said protective housing has a nearest surface adjacent to the scroll face, and the majority of said nearest surface is at least 2 mm from the scroll face.

9. The spiral wound module of claim 2 wherein at least two insulated wires protrude from the protective housing and connect the microprocessor to the sensor.

10. The spiral wound module of claim 2 wherein the sensor comprises at least two electrodes that are attached to the outer surface of the protective housing.

11. The spiral wound module of claim 2 wherein the protective housing surrounds both the sensor and a fluid conduit, said fluid conduit providing a path for fluid between the sensor and a region of the endcap assembly that is external to the protective housing.

12. The spiral wound module of claim 1, wherein the endcap assembly comprises a connecting conduit that passes radially through a portion of the endcap assembly, defining a fluid passageway between an inner conduit end and an outer conduit end; and wherein said sensor is a differential pressure sensor fluidly connected to the fluid passageway of the connecting conduit.

13. A spiral wound module assembly comprising:
a) a pressure vessel comprising: a chamber including an inner peripheral surface extending along an axis between a first vessel end and a second vessel end, and at least one feed inlet port, concentrate outlet port, and permeate outlet port;
b) a first spiral wound module located within the chamber, said first spiral wound module comprising:
i) at least one first membrane envelope wound about a hollow first permeate collection tube to form a cylinder with first scroll face, a first opposing scroll face, and a first outer peripheral surface,
ii) a first porous center section of the first permeate collection tube is located axially between two first distal sections, wherein the first porous center section contains a first set of holes that pass from a first inside surface to a first outside surface of the first permeate collection tube and that connect a first permeate channel within the first membrane envelope to the first interior cavity of the first permeate collection tube,
iii) a first feed channel adjacent to the first membrane envelope, wherein the first feed channel is suitable to enable feed flow through the first spiral wound module between the first scroll face and the first opposing scroll face, and
iv) a first endcap assembly affixed to the first spiral wound module and abutting the first scroll face, said first endcap assembly including a first outer ring that defines a first outer periphery of the first endcap assembly;
c) a second spiral wound module adjacent the first spiral wound module, said second spiral wound module comprising:
v) at least one second membrane envelope wound about a hollow second permeate collection tube to form a cylinder with second scroll face, a second opposing scroll face, and a second outer peripheral surface,
vi) a second porous center section of the second permeate collection tube is located axially between second distal sections of the second permeate collection tube, wherein the second porous center section contains a second set of second holes that pass from the second inside surface to the second outside surface of the second permeate collection tube and that connect a second permeate channel within the second membrane envelope to the second interior cavity of the second permeate collection tube,
vii) a second feed channel adjacent to the second membrane envelope, wherein the second feed channel is suitable to enable feed flow through the second spiral wound module between the second scroll face and the second opposing scroll face, and viii) a second endcap assembly affixed to the second spiral wound module and abutting the second scroll face;

wherein the first endcap assembly is adjacent the second endcap assembly; a feed fluid pathway passes through a central region located between the first scroll face and the second scroll face and connects the first feed channel with the second feed channel; the feed fluid pathway comprising a feed fluid access pathway connected to the first feed channel at the first scroll face; and the first outer ring surrounds the feed fluid access pathway and includes a radially extending annular feed flow resistor contacting the inner peripheral surface of the chamber; and wherein the spiral wound module assembly is characterized by:

an instrumented endcap assembly selected from the first endcap assembly and the second endcap assembly, wherein the instrumented endcap assembly comprises a microprocessor, an antenna, a LoRa transmitter, and at least one sensor connected to the microprocessor, wherein said sensor is suitable to provide a measured value corresponding to pressure, differential pressure, flow rate, conductivity, pH, intensity, or light intensity, and wherein said LoRa transmitter is suitable to transmit said measured value by providing sequential chirps at a radio frequency between 400 MHz and 1000 MHz.

14. The spiral wound module assembly of claim 13 wherein the first and second endcap assemblies enable a peripheral path around the second scroll face that fluidly connects the central region and a second peripheral space, wherein the second peripheral space is located between the second outer peripheral surface of the second spiral wound module and the inner peripheral surface of the chamber; and the instrumented endcap assembly further comprises:

a) a connecting conduit that passes radially through a portion of the instrumented endcap assembly, said connecting conduit defining a fluid passageway between an inner conduit end and an outer conduit end; and b) a sensor that is fluidly connected to both the connecting conduit and the feed fluid access pathway.

15. The spiral wound module assembly of claim 14 wherein the sensor is a differential pressure sensor.

16. The spiral wound module assembly of claim 15 wherein the differential pressure sensor includes a deformable barrier suitable to prevent fluid flow between the fluid passageway of the connecting conduit and said feed fluid access pathway and resulting in different measurable electronic properties as differential pressure varies across the barrier.

17. The spiral wound module assembly of claim 15 wherein the instrumented endcap assembly has an outer ring that encompasses part of the central region, and the differential pressure sensor is located within the outer ring.

18. The spiral wound module assembly of claim 15 wherein an annular groove is located on the first outer periphery of the first outer ring and the radially extending annular feed flow resistor is a brine seal located within the annular groove.

19. The spiral wound module assembly of claim 15 wherein the second outer peripheral surface of the second spiral wound module is porous and the feed fluid pathway comprises the peripheral path.

20. The spiral wound module assembly of claim 15 comprising a first peripheral space located between the first outer peripheral surface of the first spiral wound module and the inner peripheral surface of the chamber; a first resistance to bypass water flow from said first peripheral space to said central region; and a second resistance to bypass water flow from said central region to said second peripheral space; wherein the first resistance to bypass water flow is at least ten times the second resistance to bypass water flow.

21. The spiral wound module assembly of claim 15, wherein the inner conduit end is located within the outer ring, and the outer conduit end is located at the outer periphery of the first outer ring and axially positioned between the opposing scroll face and the feed flow resistor.

22. The spiral wound module assembly of claim 15, wherein the instrumented endcap assembly is selected from the group consisting of a) the first endcap assembly, further comprising an inner ring that is sealed to the first hollow permeate collection tube and comprises a first seal surface suitable to compress a sealing member between said first seal surface and a second seal surface located on the first spiral wound module; and wherein said connecting conduit passes radially through the inner ring and is fluidly connected to the first interior cavity of the first hollow permeate collection tube;

b) the second endcap assembly, further comprising an inner ring that is sealed to the second hollow permeate collection tube and comprises a second seal surface suitable to compress a sealing member between said second seal surface and a first seal surface located on the first spiral wound module; and wherein said connecting conduit passes radially through the inner ring and is fluidly connected to the second interior cavity of the first hollow permeate collection tube; and wherein the compressed sealing member joins the first and second interior cavities of respective spiral wound membrane modules and isolates the interior of a combined permeate collection region from the feed fluid access pathway, and wherein the connecting conduit is axially located between the sealing memberand the scroll face abutting the abutting instrumented endcap assembly.

23. The spiral wound module assembly of claim 15, wherein a permeate flow restrictor is provided within the combined permeate collection region and axially located between the first porous center section and the second porous center section.

24. The spiral wound module assembly of claim 15, wherein a) the first and second outer peripheral surfaces are porous and in fluid communication with first and second feed channels of first and second spiral wound modules, respectively;

b) the first endcap assembly covers at least 75% of the first scroll face and is suitable to restrict at least 75% of feed flow through the first scroll face to open areas located closer to the first permeate collection tube than to the first outer peripheral surface; and the second endcap assembly covers at least 75% of the second scroll face and is suitable to restrict at least 75% of feed flow entering the second spiral wound module to entering the second feed channel through the second outer peripheral surface.

* * * * *